US012650495B2

(12) United States Patent
Donovan et al.

(10) Patent No.: US 12,650,495 B2
(45) Date of Patent: Jun. 9, 2026

(54) DISTRIBUTED MODULAR SOLID-STATE LIDAR SYSTEM

(71) Applicant: OPSYS Tech Ltd., Holon (IL)

(72) Inventors: Mark J. Donovan, Mountain View, CA (US); Larry Fabiny, Boulder, CO (US); Minh Duong, San Jose, CA (US)

(73) Assignee: OPSYS Tech Ltd., Holon (IL)

( * ) Notice: Subject to any disclaimer, the term of this patent is extended or adjusted under 35 U.S.C. 154(b) by 81 days.

(21) Appl. No.: 18/920,877

(22) Filed: Oct. 19, 2024

(65) Prior Publication Data

US 2026/0110775 A1 Apr. 23, 2026

Related U.S. Application Data

(62) Division of application No. 16/523,459, filed on Jul. 26, 2019, now Pat. No. 12,153,163.

(Continued)

(51) Int. Cl.
*G01S 7/481* (2006.01)
(52) U.S. Cl.
CPC .......... *G01S 7/4813* (2013.01); *G01S 7/4815* (2013.01); *G01S 7/4816* (2013.01)
(58) Field of Classification Search
CPC ...... G01S 17/931; G01S 7/4813; G01S 17/87; G01S 7/4815; G01S 7/4816
See application file for complete search history.

(56) References Cited

U.S. PATENT DOCUMENTS

| | | |
|---|---|---|
| 5,157,257 A | 10/1992 | Geiger |
| 5,552,893 A | 9/1996 | Akasu |

(Continued)

FOREIGN PATENT DOCUMENTS

| | | |
|---|---|---|
| CN | 1512946 A | 7/2004 |
| CN | 101013030 A | 8/2007 |

(Continued)

OTHER PUBLICATIONS

Decision to Grant for Korean Patent Application No. 10-2022-7015754, mailed on Aug. 28, 2023, 4 pages (1 page of English Translation and 3 pages of Official Copy).

(Continued)

*Primary Examiner* — Neil R Mikeska
(74) *Attorney, Agent, or Firm* — Rauschenbach Patent Law Group, PLLC; Kurt Rauschenbach

(57) ABSTRACT

A LIDAR system includes a first optical transmitter comprising a plurality of first emitters, where each of the plurality of first emitters is positioned to generate an optical beam with a FOV at a target range when energized. A second optical transmitter includes a plurality of second emitters, where each of the plurality of second emitters is positioned to generate an optical beam with a FOV at the target range when energized. The first and second optical transmitters are positioned relative to each other so the FOVs of at least some of the optical beams generated by the first and second optical transmitter when energized overlap at the target range. An optical receiver includes a plurality of optical detectors, where a respective one of the plurality of optical detectors is positioned to detect a respective optical beam generated by at least one of the first and second optical transmitter and reflected by a target in the FOV at the target range. A controller includes a first and second output being connected to respective control inputs of the first and second optical transmitters, and a third output being connected to a control input of the optical receiver. The controller generates control signals at the first and second outputs that control energizing select ones of the plurality of first and the plurality of second emitters that generate optical beams with the FOVs that overlap at the target range and generating a control signal at the third output that activates selected ones (Continued)

of the plurality of optical detectors to detect optical beams reflected from an object at the target range.

22 Claims, 21 Drawing Sheets

Related U.S. Application Data

(60) Provisional application No. 62/714,463, filed on Aug. 3, 2018.

(56) References Cited

U.S. PATENT DOCUMENTS

| | | | |
|---|---|---|---|
| 5,909,296 A | 6/1999 | Tsacoyeanes |
| 6,057,909 A | 5/2000 | Yahav et al. |
| 6,061,001 A | 5/2000 | Sugimoto |
| 6,246,708 B1 | 6/2001 | Thornton et al. |
| 6,353,502 B1 | 3/2002 | Marchant et al. |
| 6,680,788 B1 | 1/2004 | Roberson et al. |
| 6,717,972 B2 | 4/2004 | Steinle et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,860,350 B2 | 3/2005 | Beuhler et al. |
| 6,888,871 B1 | 5/2005 | Zhang et al. |
| 7,065,112 B2 | 6/2006 | Ghosh et al. |
| 7,110,183 B2 | 9/2006 | Von Freyhold et al. |
| 7,544,945 B2 | 6/2009 | Tan et al. |
| 7,652,752 B2 | 1/2010 | Fetzer et al. |
| 7,702,191 B1 | 4/2010 | Geron et al. |
| 7,746,450 B2 | 6/2010 | Willner et al. |
| 7,773,204 B1 | 8/2010 | Nelson |
| 7,969,558 B2 | 6/2011 | Hall |
| 8,072,581 B1 | 12/2011 | Breiholz |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | Van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,348,018 B2 | 5/2016 | Eisele et al. |
| 9,360,554 B2 | 6/2016 | Retterath et al. |
| 9,378,640 B2 | 6/2016 | Mimeault et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,575,184 B2 | 2/2017 | Gilliland et al. |
| 9,658,322 B2 | 5/2017 | Lewis |
| 9,674,415 B2 | 6/2017 | Wan et al. |
| 9,791,557 B1 | 10/2017 | Wyrwas et al. |
| 9,841,495 B2 | 12/2017 | Campbell et al. |
| 9,857,468 B1 | 1/2018 | Eichenholz et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,007,001 B1 | 6/2018 | LaChapelle et al. |
| 10,063,849 B2 | 8/2018 | Pacala et al. |
| 10,191,156 B2 | 1/2019 | Steinberg et al. |
| 10,295,660 B1 | 5/2019 | McMichael et al. |
| 10,488,492 B2 | 11/2019 | Hamel et al. |
| 10,514,444 B2 | 12/2019 | Donovan |
| 10,761,195 B2 | 9/2020 | Donovan |
| 10,928,486 B2 | 2/2021 | Donovan |
| 11,016,178 B2 | 5/2021 | Donovan |
| 11,061,234 B1 | 7/2021 | Zhu et al. |
| 11,320,538 B2 | 5/2022 | Donovan et al. |
| 2002/0117340 A1 | 8/2002 | Stettner |
| 2002/0195496 A1 | 12/2002 | Tsikos et al. |
| 2003/0043363 A1 | 3/2003 | Jamieson et al. |
| 2003/0147652 A1 | 8/2003 | Green et al. |
| 2004/0120717 A1 | 6/2004 | Clark et al. |
| 2004/0228375 A1 | 11/2004 | Ghosh et al. |
| 2005/0025211 A1 | 2/2005 | Zhang et al. |
| 2005/0180473 A1 | 8/2005 | Brosnan |
| 2005/0232628 A1 | 10/2005 | Von Freyhold et al. |
| 2006/0132752 A1 | 6/2006 | Kane |
| 2006/0231771 A1 | 10/2006 | Lee et al. |
| 2006/0244978 A1 | 11/2006 | Yamada et al. |
| 2007/0024849 A1 | 2/2007 | Carrig et al. |
| 2007/0071056 A1 | 3/2007 | Chen |
| 2007/0091960 A1 | 4/2007 | Gauggel et al. |
| 2007/0131842 A1 | 6/2007 | Ernst |
| 2007/0177841 A1 | 8/2007 | Danziger |
| 2007/0181810 A1 | 8/2007 | Tan et al. |
| 2007/0219720 A1 | 9/2007 | Trepagnier et al. |
| 2008/0074640 A1 | 3/2008 | Walsh et al. |
| 2008/0186470 A1 | 8/2008 | Hipp |
| 2009/0027651 A1 | 1/2009 | Pack et al. |
| 2009/0140047 A1 | 6/2009 | Yu et al. |
| 2009/0161710 A1 | 6/2009 | Hoashi et al. |
| 2009/0273770 A1 | 11/2009 | Bauhahn et al. |
| 2009/0295986 A1 | 12/2009 | Topliss et al. |
| 2010/0046953 A1 | 2/2010 | Shaw et al. |
| 2010/0215066 A1 | 8/2010 | Mordaunt et al. |
| 2010/0271614 A1 | 10/2010 | Albuquerque et al. |
| 2010/0302528 A1 | 12/2010 | Hall |
| 2011/0176567 A1 | 7/2011 | Joseph |
| 2011/0216304 A1 | 9/2011 | Hall |
| 2012/0038903 A1 | 2/2012 | Weimer et al. |
| 2013/0163626 A1 | 6/2013 | Seurin et al. |
| 2013/0163627 A1 | 6/2013 | Seurin et al. |
| 2013/0206967 A1 | 8/2013 | Shpunt et al. |
| 2013/0208256 A1 | 8/2013 | Mamidipudi et al. |
| 2013/0208753 A1 | 8/2013 | Van Leeuwen et al. |
| 2014/0043309 A1 | 2/2014 | Go et al. |
| 2014/0049610 A1 | 2/2014 | Hudman et al. |
| 2014/0071427 A1 | 3/2014 | Last |
| 2014/0111812 A1 | 4/2014 | Baeg et al. |
| 2014/0139467 A1 | 5/2014 | Ghosh et al. |
| 2014/0160341 A1 | 6/2014 | Tickoo et al. |
| 2014/0218898 A1 | 8/2014 | Seurin et al. |
| 2014/0247841 A1 | 9/2014 | Seurin et al. |
| 2014/0267701 A1 | 9/2014 | Aviv et al. |
| 2014/0303829 A1 | 10/2014 | Lombrozo et al. |
| 2014/0312233 A1 | 10/2014 | Mark et al. |
| 2014/0333995 A1 | 11/2014 | Seurin et al. |
| 2014/0350836 A1 | 11/2014 | Stettner et al. |
| 2014/0376092 A1 | 12/2014 | Mor |
| 2015/0055117 A1 | 2/2015 | Pennecot et al. |
| 2015/0069113 A1 | 3/2015 | Wang et al. |
| 2015/0097947 A1 | 4/2015 | Hudman et al. |
| 2015/0103358 A1 | 4/2015 | Flascher |
| 2015/0109603 A1 | 4/2015 | Kim et al. |
| 2015/0123995 A1 | 5/2015 | Zavodny et al. |
| 2015/0131080 A1 | 5/2015 | Retterath et al. |
| 2015/0160341 A1 | 6/2015 | Akatsu et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0260843 A1 | 9/2015 | Lewis |
| 2015/0311673 A1 | 10/2015 | Wang et al. |
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1 | 1/2016 | Gilliland et al. |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |

(56) References Cited

U.S. PATENT DOCUMENTS

| | | |
|---|---|---|
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1 | 10/2016 | Hjelmstad |
| 2016/0306358 A1 | 10/2016 | Kang et al. |
| 2016/0335778 A1 | 11/2016 | Smits |
| 2016/0348636 A1 | 12/2016 | Ghosh et al. |
| 2017/0003392 A1 | 1/2017 | Bartlett et al. |
| 2017/0026633 A1 | 1/2017 | Riza |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0285169 A1 | 10/2017 | Holz |
| 2017/0289524 A1 | 10/2017 | Pacala et al. |
| 2017/0299722 A1 | 10/2017 | Ouyang et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1 | 2/2018 | Jarosinski et al. |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Von Novak et al. |
| 2018/0107221 A1 | 4/2018 | Droz et al. |
| 2018/0113200 A1 | 4/2018 | Steinberg et al. |
| 2018/0113208 A1 | 4/2018 | Bergeron et al. |
| 2018/0120441 A1 | 5/2018 | Elooz et al. |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shu et al. |
| 2018/0269646 A1 | 9/2018 | Welford et al. |
| 2018/0275248 A1 | 9/2018 | Bailey et al. |
| 2018/0299552 A1 | 10/2018 | Shu et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Miyashita |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1 | 1/2019 | Pacala et al. |
| 2019/0018115 A1 | 1/2019 | Schmitt et al. |
| 2019/0033429 A1 | 1/2019 | Donovan |
| 2019/0036308 A1 | 1/2019 | Carson et al. |
| 2019/0049662 A1 | 2/2019 | Thomsen et al. |
| 2019/0056497 A1 | 2/2019 | Pacala et al. |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0146071 A1 | 5/2019 | Donovan |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2019/0302246 A1 | 10/2019 | Donovan et al. |
| 2020/0018835 A1 | 1/2020 | Pei et al. |
| 2020/0041614 A1 | 2/2020 | Donovan et al. |
| 2020/0081101 A1 | 3/2020 | Donovan et al. |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2020/0408908 A1 | 12/2020 | Donovan |
| 2021/0033708 A1 | 2/2021 | Fabiny |
| 2021/0041567 A1 | 2/2021 | Milgrome et al. |
| 2021/0157000 A1 | 5/2021 | Imaki |
| 2021/0181311 A1 | 6/2021 | Donovan |
| 2021/0231779 A1 | 7/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |

FOREIGN PATENT DOCUMENTS

| | | |
|---|---|---|
| CN | 101080733 A | 11/2007 |
| CN | 101545582 A | 9/2009 |
| CN | 101692126 A | 4/2010 |
| CN | 103633557 A | 3/2014 |
| CN | 104898125 A | 9/2015 |
| CN | 105705964 A | 6/2016 |
| CN | 106464366 A | 2/2017 |
| CN | 109073757 A | 12/2018 |
| CN | 107728156 B | 11/2019 |
| CN | 110402398 A | 11/2019 |
| CN | 110914702 A | 3/2020 |
| CN | 111356934 A | 6/2020 |
| CN | 111919137 A | 11/2020 |
| CN | 112543875 A | 3/2021 |
| CN | 113692540 A | 11/2021 |
| CN | 113906316 A | 1/2022 |
| CN | 113924506 A | 1/2022 |
| CN | 114096882 A | 2/2022 |
| CN | 114174869 A | 3/2022 |
| DE | 19717399 A1 | 6/1999 |
| DE | 10103861 A1 | 8/2001 |
| DE | 102007004609 A1 | 8/2007 |
| DE | 102014216390 A1 | 2/2016 |
| DE | 102019005059 A1 | 2/2020 |
| EP | 1160540 A1 | 12/2001 |
| EP | 1444696 B1 | 3/2005 |
| EP | 1569007 A2 | 8/2005 |
| EP | 2656099 A1 | 10/2013 |
| EP | 2656100 A1 | 10/2013 |
| EP | 2656106 A1 | 10/2013 |
| EP | 2775316 A2 | 9/2014 |
| EP | 3159711 A1 | 4/2017 |
| EP | 3168641 A1 | 5/2017 |
| EP | 3446153 A2 | 2/2019 |
| EP | 3497477 A1 | 6/2019 |
| EP | 3526625 A1 | 8/2019 |
| EP | 3596492 A1 | 1/2020 |
| EP | 3658949 A1 | 6/2020 |
| EP | 3710855 A2 | 9/2020 |
| EP | 3775979 A1 | 2/2021 |
| EP | 3830602 A1 | 6/2021 |
| EP | 3953727 A1 | 2/2022 |
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |

(56)     References Cited

FOREIGN PATENT DOCUMENTS

| | | | |
|---|---|---|---|
| JP | H05-243552 | A | 9/1993 |
| JP | H7-253460 | A | 10/1995 |
| JP | H08-280173 | A | 10/1996 |
| JP | H10-126007 | A | 5/1998 |
| JP | 2000-147604 | A | 5/2000 |
| JP | 2002-214361 | A | 7/2002 |
| JP | 2003-258359 | A | 9/2003 |
| JP | 2003-536061 | A | 12/2003 |
| JP | 2004-078255 | A | 3/2004 |
| JP | 2004-094115 | A | 3/2004 |
| JP | 2004-361315 | A | 12/2004 |
| JP | 2005-331273 | A | 12/2005 |
| JP | 2006-162386 | A | 6/2006 |
| JP | 2007-214564 | A | 8/2007 |
| JP | 2008-015434 | A | 1/2008 |
| JP | 4108478 | B2 | 6/2008 |
| JP | 2008-180719 | A | 8/2008 |
| JP | 2009-103529 | A | 5/2009 |
| JP | 2009-170870 | A | 7/2009 |
| JP | 2009-204691 | A | 9/2009 |
| JP | 2010-091855 | A | 4/2010 |
| JP | 2010-256291 | A | 11/2010 |
| JP | 2011-003748 | A | 1/2011 |
| JP | 2012-504771 | A | 2/2012 |
| JP | 5096008 | B2 | 12/2012 |
| JP | 2013-050310 | A | 3/2013 |
| JP | 2013-113669 | A | 6/2013 |
| JP | 2014-059302 | A | 4/2014 |
| JP | 2014-077658 | A | 5/2014 |
| JP | 2015-040671 | A | 3/2015 |
| JP | 2016-014665 | A | 1/2016 |
| JP | 2016-146417 | A | 8/2016 |
| JP | 2016-176721 | A | 10/2016 |
| JP | 2016-188808 | A | 11/2016 |
| JP | 2016-540189 | A | 12/2016 |
| JP | 2017-053833 | A | 3/2017 |
| JP | 2017-134814 | A | 8/2017 |
| JP | 2018-025632 | A | 2/2018 |
| JP | 2019-060652 | A | 4/2019 |
| JP | 2019-068528 | A | 4/2019 |
| JP | 2019-509474 | A | 4/2019 |
| JP | 2019-516101 | A | 6/2019 |
| JP | 2020-510208 | A | 4/2020 |
| JP | 2021-503085 | A | 2/2021 |
| JP | 2021-507260 | A | 2/2021 |
| JP | 6839861 | B2 | 3/2021 |
| JP | 6865492 | B2 | 4/2021 |
| JP | 2021-073462 | A | 5/2021 |
| JP | 2021-073473 | A | 5/2021 |
| JP | 2021-105613 | A | 7/2021 |
| JP | 2021-519926 | A | 8/2021 |
| JP | 2021-139918 | A | 9/2021 |
| JP | 2021-532368 | A | 11/2021 |
| JP | 2022-001885 | A | 1/2022 |
| JP | 6995413 | B2 | 1/2022 |
| JP | 2022-022361 | A | 2/2022 |
| JP | 2022-036224 | A | 3/2022 |
| JP | 7037830 | B2 | 3/2022 |
| JP | 2022-526998 | A | 5/2022 |
| JP | 2022-534500 | A | 8/2022 |
| KR | 10-2000-0053620 | A | 8/2000 |
| KR | 10-2009-0016499 | A | 2/2009 |
| KR | 10-2012-0053045 | A | 5/2012 |
| KR | 10-2012-0061033 | A | 6/2012 |
| KR | 10-2013-0140554 | A | 12/2013 |
| KR | 10-2014-0138724 | A | 12/2014 |
| KR | 10-2015-0045735 | A | 4/2015 |
| KR | 10-2016-0101140 | A | 8/2016 |
| KR | 10-2018-0049937 | A | 5/2018 |
| KR | 10-2018-0064969 | A | 6/2018 |
| KR | 10-2018-0128447 | A | 12/2018 |
| KR | 10-2019-0076725 | A | 7/2019 |
| KR | 10-2019-0117418 | A | 10/2019 |
| KR | 10-2019-0120403 | A | 10/2019 |
| KR | 10-2020-0011351 | A | 2/2020 |
| KR | 10-2020-0075014 | A | 6/2020 |
| KR | 10-2020-0096632 | A | 8/2020 |
| KR | 10-2020-0128435 | A | 11/2020 |
| KR | 10-2021-0021409 | A | 2/2021 |
| KR | 10-2218679 | B1 | 2/2021 |
| KR | 10-2021-0029831 | A | 3/2021 |
| KR | 10-2021-0065207 | A | 6/2021 |
| KR | 10-2021-0137584 | A | 11/2021 |
| KR | 10-2021-0137586 | A | 11/2021 |
| KR | 10-2326493 | B1 | 11/2021 |
| KR | 10-2326508 | B1 | 11/2021 |
| KR | 10-2022-0003600 | A | 1/2022 |
| KR | 10-2022-0017412 | A | 2/2022 |
| KR | 10-2364531 | B1 | 2/2022 |
| KR | 10-2022-0024177 | A | 3/2022 |
| KR | 10-2022-0025924 | A | 3/2022 |
| KR | 10-2022-0038691 | A | 3/2022 |
| KR | 10-2398080 | B1 | 5/2022 |
| WO | 1999/042856 | A2 | 8/1999 |
| WO | 2002/065153 | A1 | 8/2002 |
| WO | 2006/044758 | A2 | 4/2006 |
| WO | 2006/083349 | A2 | 8/2006 |
| WO | 2013/107709 | A1 | 7/2013 |
| WO | 2014/014838 | A2 | 1/2014 |
| WO | 2015/040671 | A1 | 3/2015 |
| WO | 2015/059705 | A1 | 4/2015 |
| WO | 2017/112416 | A1 | 6/2017 |
| WO | 2017/132704 | A1 | 8/2017 |
| WO | 2017/184336 | A2 | 10/2017 |
| WO | 2018/028795 | A1 | 2/2018 |
| WO | 2018/082762 | A1 | 5/2018 |
| WO | 2018/166609 | A1 | 9/2018 |
| WO | 2018/166610 | A1 | 9/2018 |
| WO | 2018/166611 | A1 | 9/2018 |
| WO | 2018/169758 | A1 | 9/2018 |
| WO | 2018/180391 | A1 | 10/2018 |
| WO | 2018/181250 | A1 | 10/2018 |
| WO | 2018/191495 | A1 | 10/2018 |
| WO | 2019/010320 | A1 | 1/2019 |
| WO | 2019/022941 | A1 | 1/2019 |
| WO | 2019/064062 | A1 | 4/2019 |
| WO | 2019/115148 | A1 | 6/2019 |
| WO | 2019/195054 | A1 | 10/2019 |
| WO | 2019/221776 | A2 | 11/2019 |
| WO | 2020/028173 | A1 | 2/2020 |
| WO | 2020/210176 | A1 | 10/2020 |
| WO | 2020/242834 | A1 | 12/2020 |
| WO | 2020/251891 | A1 | 12/2020 |
| WO | 2020/263735 | A1 | 12/2020 |
| WO | 2021/021872 | A1 | 2/2021 |
| WO | 2021/150860 | A1 | 7/2021 |
| WO | 2021/236201 | A2 | 11/2021 |
| WO | 2022/103778 | A1 | 5/2022 |

OTHER PUBLICATIONS

Extended European Search Report received for European Patent Application Serial No. 19843301.3, mailed on Feb. 18, 2022, 10 pages.

Geib, et al., "Fabrication and Performance of Two-Dimensional Matrix Addressable Arrays of Integrated Vertical-Cavity Lasers and Resonant Cavity Photodetectors", IEEE Journal of Selected Topics In Quantum Electronics, vol. 8, No. 4, Jul./Aug. 2002, pp. 943-947.

Knodl, et al., "Bipolar Cascade VCSEL with 130% Differential Quantum Efficiency", Annual Report 2000, Optoelectronics Department, pp. 11-14.

Moench et al., "VCSEL Based Sensors for Distance and Velocity", Vertical Cavity Surface-Emitting Lasers XX, Proc. Of SPIE, vol. 9766, 2016, pp. 97660A-1-97660A-11.

Morgan, et al., "Two-Dimensional Matrix Addressed Vertical Cavity Top-Surface Emitting Laser Array Display", IEEE Photonics Technology Letters, vol. 6, No. 8, Aug. 1994, pp. 913-917.

Plant, et al., "256-Channel Bidirectional Optical Interconnect Using VCSELs and Photodiodes on CMOS", Journal of Lightwave Technology, vol. 19, No. 8, Aug. 2001, pp. 1093-1103.

Notice of Allowance received for Korean Patent Application Serial No. 10-2021-7006391, mailed on Feb. 9, 2022, 03 pages (1 page of English Translation and 2 pages of Official Copy).

(56)　　　　　References Cited

OTHER PUBLICATIONS

Office Action received for Chinese Patent Application Serial No. 201980051834.6, mailed on Dec. 7, 2023, 23 pages (8 pages of English Translation and 15 pages of Official Copy).

Office Action received for Korean Patent Application No. 10-2021-7006391, mailed on May 14, 2021, 17 pages (9 pages of English Translation and 8 pages of Official Copy).

Office Action received for Korean Patent Application No. 10-2022-7015754, mailed on Dec. 12, 2022, 21 pages (11 pages of English Translation and 10 pages of Official Copy).

Office Action received for Korean Patent Application Serial No. 10-2021-7006391, mailed on Oct. 22, 2021, 5 pages. (2 pages of English Translation and 3 pages of Official Copy).

Orenstein, et al., "Matrix Addressable Vertical Cavity Surface Emitting Laser Array", Electronics Letters, vol. 27, No. 5, Feb. 28, 1991, pp. 437-438.

*400*

*404*

*402*

Figure 20:
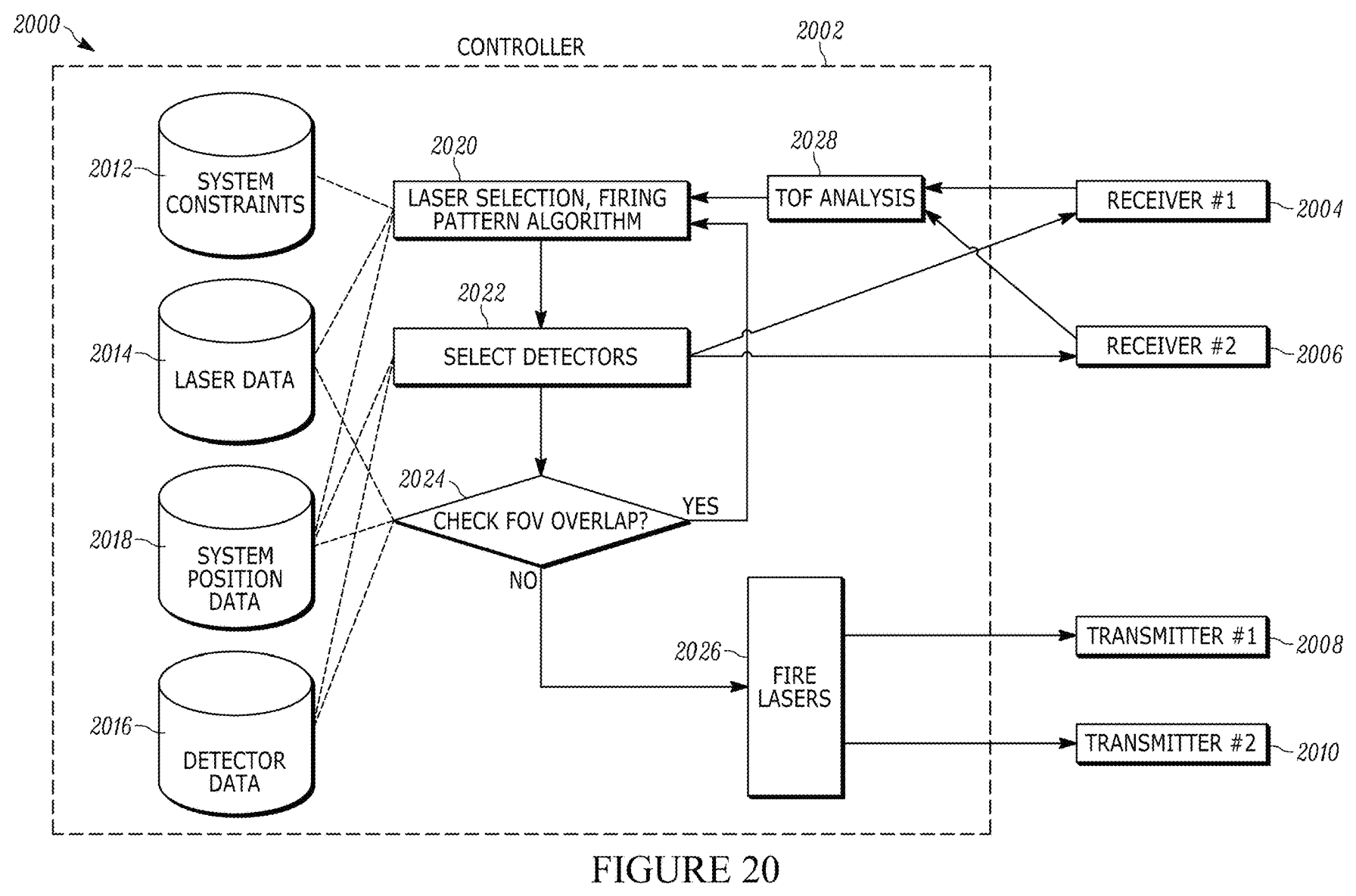

RECEIVER #1    2004

RECEIVER #2    2006

TRANSMITTER #1    2008

TRANSMITTER #2    2010

CONTROLLER    2002

2028    TOF ANALYSIS

2020    LASER SELECTION, FIRING PATTERN ALGORITHM

2022    SELECT DETECTORS

2024    CHECK FOV OVERLAP?    YES    NO

FIRE LASERS    2026

2012    SYSTEM CONSTRAINTS

2014    LASER DATA

2018    SYSTEM POSITION DATA

2016    DETECTOR DATA

DISTRIBUTED MODULAR SOLID-STATE LIDAR SYSTEM

CROSS REFERENCE TO RELATED APPLICATION

The present application is a Divisional of U.S. patent application Ser. No. 16/523,459, entitled "Distributed Modular Solid-State LIDAR System", filed on Jul. 26, 2019, which claims benefit of U.S. Provisional Patent Application Ser. No. 62/714,463, entitled "Distributed Modular Solid-State LIDAR System", filed on Aug. 3, 2018. The entire contents of U.S. patent application Ser. No. 16/523,459 and U.S. Provisional Patent Application Ser. No. 62/714,463 are herein incorporated by reference.

The section headings used herein are for organizational purposes only and should not to be construed as limiting the subject matter described in the present application in any way.

INTRODUCTION

Autonomous, self-driving, and semi-autonomous auto-mobiles use a combination of different sensors and tech-nologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high resolution 3D mapping of the surrounding environment.

The majority of commercially available LIDAR systems used for autonomous vehicles today utilize a small number of lasers, combined with some method of mechanically scanning the environment. For example, several manufac-turers provide rotating LIDAR systems with transmit/re-ceive optics located on a spinning motor in order provide a 360° horizontal field-of-view. A one-dimensional (1D) fixed array of lasers is used for the vertical direction, and the horizontal scan is accomplished through the rotation. Cur-rently, the largest 1D array in the commercial market con-tains 128 lasers. Some vendors utilize a moving mirror to scan the FOV. For example, the mirror can be actuated using MEMS or galvanometers. In these systems, often only 1 or 2 lasers are used, in combination with two mirrors, one for the horizontal direction and one for the vertical direction.

In mechanically scanned LIDAR systems, the scanning method puts physical constraints on the receiver and trans-mitter optics. For example, in a rotating motor scanned LIDAR system, the receiver is typically placed together with the transmitter on the same motor in order allow the trans-mitter and receiver to "look at the same spot" during operation. Similarly, the receiver in the scanning mirror devices is often positioned to make use of the same moving mirror as the transmitter so that the light reflected from the target travels back through the shared mirror optics to reach the receiver. These physical constraints can put limits on the size of the LIDAR system(s) and the size and location of individual components. In addition, these physical con-straints impact performance features like measurement range and SNR/cross-talk.

BRIEF DESCRIPTION OF THE DRAWINGS

The present teaching, in accordance with preferred and exemplary embodiments, together with further advantages thereof, is more particularly described in the following detailed description, taken in conjunction with the accom-panying drawings. The skilled person in the art will under-stand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 20 illustrates a block diagram of an embodiment of a controller of the present teaching.

DESCRIPTION OF VARIOUS EMBODIMENTS

Figure 1:
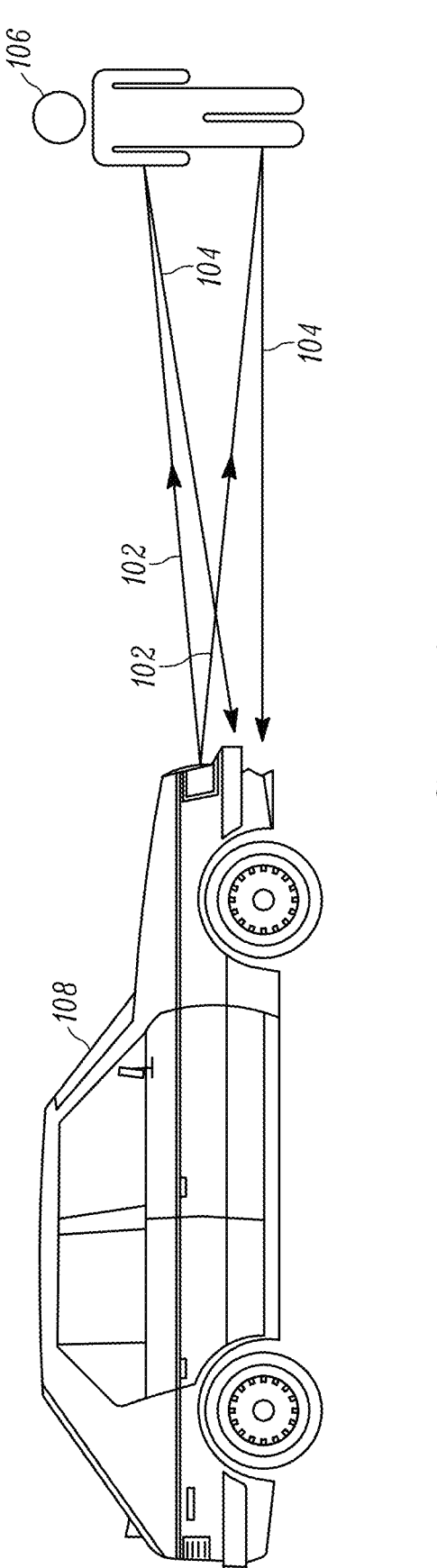
FIG. 1 illustrates the operation of a LIDAR system implemented in a vehicle.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching can be performed in any order and/or simultaneously as long as the teaching remains operable. Furthermore, it should be understood that the apparatus and methods of the present teaching can include any number or all of the described embodiments as long as the teaching remains operable.

Known LIDAR systems with moving parts are problematic for many reasons including being prone to reliability issues. One aspect of the present teaching is the realization that a solid-state LIDAR system that requires no moving parts for scanning the field-of-view can be designed with fewer physical constraints, allowing for both performance improvement and increased flexibility in integration of the LIDAR system within an autonomous vehicle. In addition, a solid-state system with substantially more lasers makes possible operational modes that are not achievable with mechanical scanning, such as the ability to randomly scan the field-of-view without any mechanical constraint on the scanning pattern.

For many reasons, LIDAR systems generally require multiple separate units to support the measurement requirements. These reasons include, for example, size limitations, mounting restrictions, measurement requirements, integrations with other systems and many others. As such, LIDAR systems are needed that are modular and easily distributed.

The present teaching relates to solid-state LIDAR systems that contain no moving parts, with a plurality of lasers, where each laser can correspond to a single fixed projection angle. The use of solid-state lasers by itself does not mean that there are no moving parts, as MEMS devices are often referred to as solid-state. MEMS devices in LIDAR systems, however, typically incorporate physical motion, which can be a concern for reliability and device lifetime. One feature of the LIDAR system according to the present teaching is that the modular distributed system design is compatible with all solid-state systems, including those systems that use solid-state laser arrays and/or systems without MEMS devices. This includes systems with no physical motion.

FIG. 1 illustrates the operation of a LIDAR system implemented in a vehicle. The LIDAR system 100 includes a laser projector, also referred to as an illuminator, that projects light beams 102 generated by a light source toward a target scene and a receiver that receives the light 104 that reflects of an object, shown as a person 106, in that target scene. LIDAR systems typically also include a controller and/or system processor that computes the distance information about the object 106 from the reflected light, and an element that can scan or provide a particular pattern of the light that may be a static pattern across a desired range and field-of-view. The receiver, controller, and system processor are used to convert the received signal light into measurements that represent a pointwise 3D map of the surrounding environment that falls within the LIDAR system range and field-of-view. In various embodiments, the controller can be a simple electrical circuit or can be a more complicated processor, depending on the particular application and desired performance.

The laser source and optical beam projection system that form the illuminator and the receiver may be located on the front side of a vehicle 108. The laser source and optical beam projection system may also be referred to as a transmitter. A person 106, and/or another object, such as a car or light pole, will provide light reflected from the source back to the receiver. A controller or processor then determines the range, or distance, to the object. As is known in the art, a LIDAR receiver calculates range information based on time-of-flight measurements of light pulses emitted from the light source. In addition, known information about the optical beam profile that illuminates the scene in a target plane associated with a particular range and, based on the particular design of the source and projector system, is used to determine location information about the reflecting surface, thereby generating a complete X, Y, Z or three-dimensional picture of the scene. In other words, the pointwise three-dimensional (3D) map of the surrounding environment represents a collection of measurement data that indicates position information from all the surfaces that reflect the illumination from the source to the receiver within the field-of-view of the LIDAR system. In this way, a 3D representation of objects in the field-of-view of the LIDAR system is obtained. The pointwise 3D data map may also be referred to as a measurement point cloud.

Figure 2:
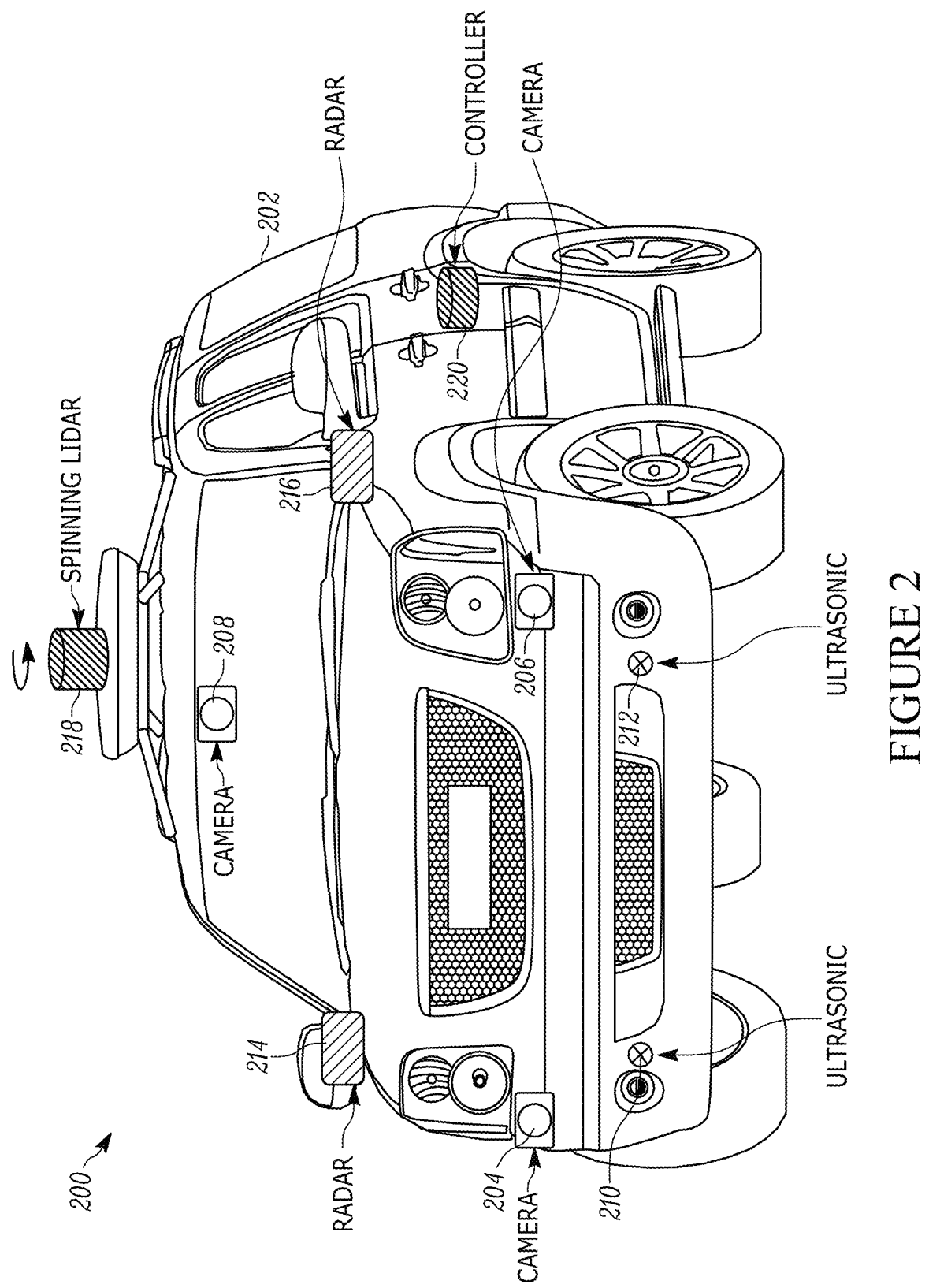
FIG. 2 illustrates a distributed sensor system for an autonomous vehicle that utilizes multiple types of known sensors.

FIG. 2 illustrates a distributed sensor system 200 for an autonomous vehicle 202 that utilizes multiple types of known sensors 204, 206, 208, 210, 212, 214, 216, 218. Each sensor technology has strengths and weaknesses. The combination of measurements output from the different sensors 204, 206, 208, 210, 212, 214, 216, 218 is used to produce a set of data from the scene. The data set from the distributed sensor system 200 that includes a variety of measurements from the scene is processed together, enabling error-free, safe, and reliable navigation under all conditions. The distributed sensor system 200 includes multiple cameras 204, 206, 208, multiple ultrasonic sensors 210, 212, multiple radars 214, 216, a rotating LIDAR system 218, and a controller 220. The autonomous car 202 uses cameras 204, 206, 208 that can distinguish colors. Cameras 204, 206, 208 may also be used to see traffic lights, turn signals, and other emitted light from the scene being measured. Cameras 204, 206, 208 can also be mounted with small physical separation, and their images combined to produce a stereo image. Ultrasonic sensors 210, 212 are used to detect proximity of objects within a few meters of the car. Radar 214, 216 is used to detect moving objects at long distance. In general, radar 214, 216 does not operate with the high resolution of the LIDAR system 218. The LIDAR system 218 is used to produce a high-resolution 3D point cloud of the environment in real-time. The controller 220 is used to generate and process the data set that is provided by the outputs of measurements from all the various sensors 204, 206, 208, 210, 212, 214, 216, 218. The controller may also be used to coordinate the operation of the various sensors 204, 206, 208, 210, 212, 214.

Figure 3:
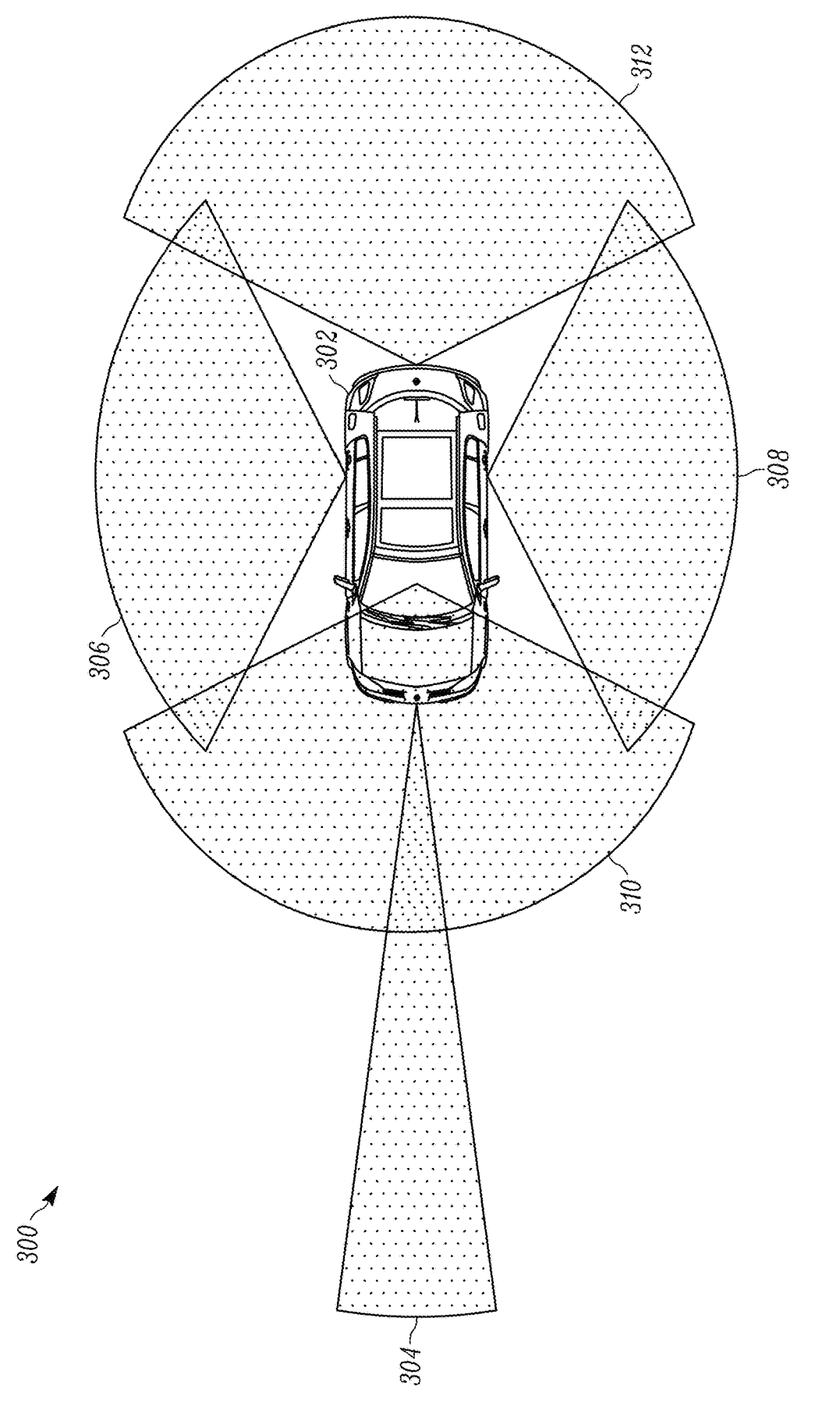
FIG. 3 illustrates a schematic diagram representing a multi-sensor LIDAR system with multiple two-dimensional fields-of-view and ranges for an automobile.

FIG. 3 illustrates a schematic diagram representing a multi-sensor LIDAR system 300 with multiple two-dimensional fields-of-view and ranges for an automobile 302. The system includes multiple LIDAR modules. The modules are not shown, only resulting fields-of-view and ranges are shown. For example, an adaptive cruise control function may require a field-of-view and range 304 with a narrow field-of-view, but with a longer-distance range requirement, compared to a system with a wider field-of-view and shorter range with a side-looking "surround view" field-of-view and range 306, 308. The composite field-of-view for the automobile is the combined field-of-view of all the LIDAR modules positioned around the vehicle, which can differ in performance characteristics of some or all of the modules. In the system 300 illustrated FIG. 3, five LIDAR modules (not shown) are used to create the composite field-of-view. The field-of-view and range 304 of the long-distance forward-looking LIDAR system has a field-of-view that overlaps with a second LIDAR module, which has a field-of-view and range 310 with a wider field-of-view, but a shorter range capability. There is also a rear-view module that has field-of-view and range 312 with similar dimensions of the field-of-view and range 310 of the second LIDAR system.

Although the present teaching describes LIDAR systems in the context of automotive vehicles, where LIDAR is widely used for autonomous, or self-driving, or driver-assisted vehicles, it should be understood that the embodiments may be applicable to any type of vehicle. Other types of vehicles might include robots, tractors, trucks, airplanes, drones, boats, ships, and others. The present teachings are also applicable to various stationary applications. For example, in high density, metropolitan areas, LIDAR can be employed to monitor traffic, both vehicular and pedestrian. It is anticipated that LIDAR systems will be deployed in many different applications, especially as the cost of the LIDAR systems becomes reduced in the near future. One skilled in the art will appreciate that the present teaching is not limited by the types of target objects described herein as being detected and ranged, but is more broadly applicable to any type of target.

Figure 4:
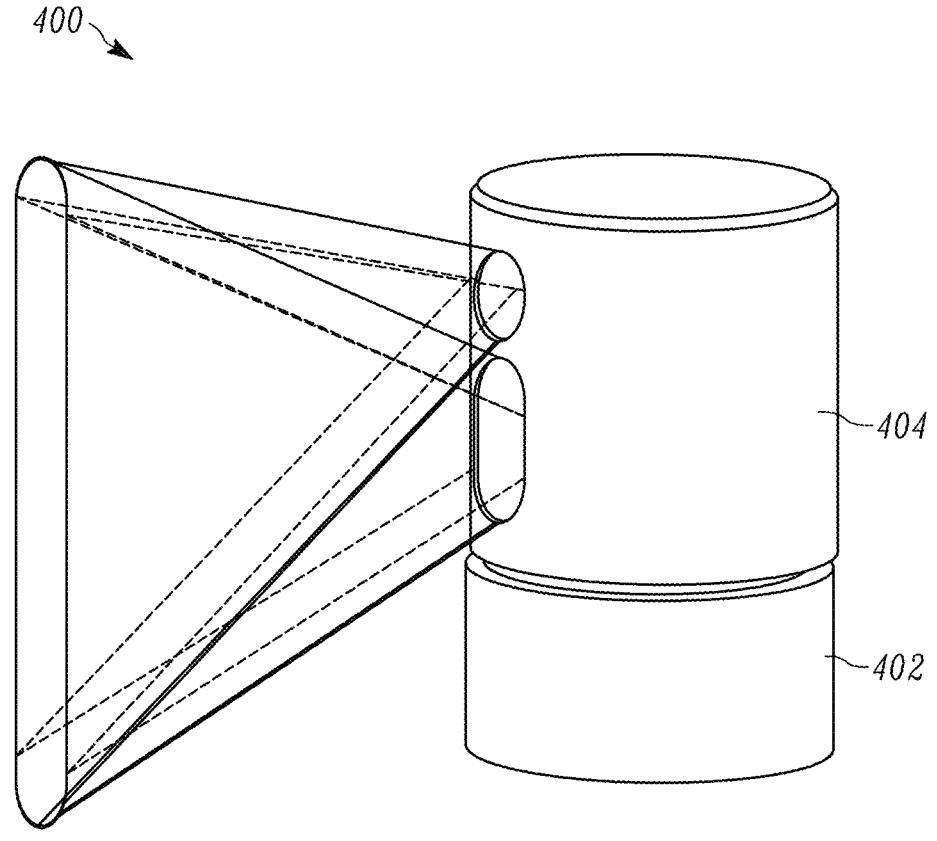
FIG. 4 illustrates a schematic diagram of known rotating LIDAR system for a vehicle.

FIG. 4 illustrates a schematic diagram of known rotating LIDAR system 400 for a vehicle. The LIDAR system 400 uses a rotating motor to provide a 360° horizontal scan of the environment. The LIDAR system 400 has a base 402. For example, the base 402 can be fixed to an automobile (not shown). The top portion 404 of the LIDAR system rotates relative to the base and contains the receiver optics and transmitter optics. The field-of-view of the transmitter and the field-of-view of the receiver overlap over the distances corresponding to the target image plane. The receiver and transmitter optics may be 1D arrays of lasers and detectors that are fixed in a fashion so as to cover the desired vertical field-of-view. Arrays of 16, 32, 64, and even 128 lasers are sometimes used with rotating LIDAR systems, such as LIDAR system 400 shown in FIG. 4. The vertical angular resolution is fixed, and typically equal to the ratio of the vertical field-of-view to the number of lasers in the fixed array. The horizontal angular resolution is a function of the rotation speed and the operating parameters of the system, and can be varied based on the application and desired performance.

Figure 5:
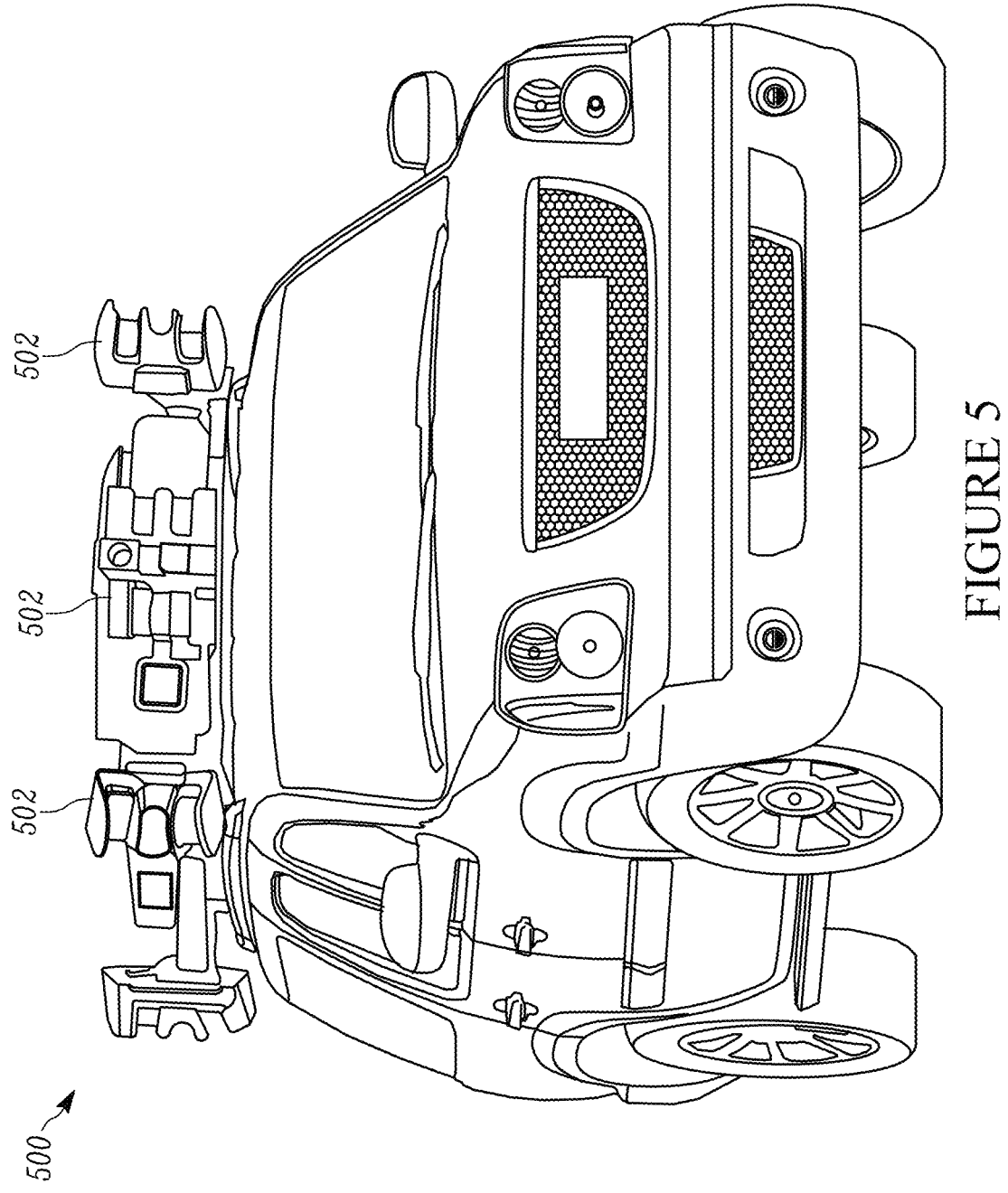
FIG. 5 illustrates an autonomous vehicle equipped with multiple known rotating LIDAR systems.

In concept, a single rotating LIDAR system can provide a full 360° view, enabling the use of a single LIDAR system. However, in practice, multiple rotating LIDAR systems are used in order to split the field-of-view around the vehicle. FIG. 5 illustrates an autonomous vehicle equipped with multiple known rotating LIDAR systems 500. The system illustrated in FIG. 5 includes multiple separate rotating LIDAR systems 502 mounted on a roof rack, each configured to achieve a separate field-of-view that is less than 180°. Some systems include more than twelve separate rotating LIDAR systems 502. Note that, in general, a substantial portion of each rotating LIDAR unit has the field-of-view blocked in a direction to minimize optical cross-talk of the multiple rotating LIDAR units. When the rotating units are pointed in the direction where the field-of-view is blocked, no useful data is being generated by that particular LIDAR unit. In that regard, a significant penalty in cost and efficiency results from the use of rotating LIDAR versus a LIDAR system that operates continuously with a field-of-view of less than 180°.

Figure 6:
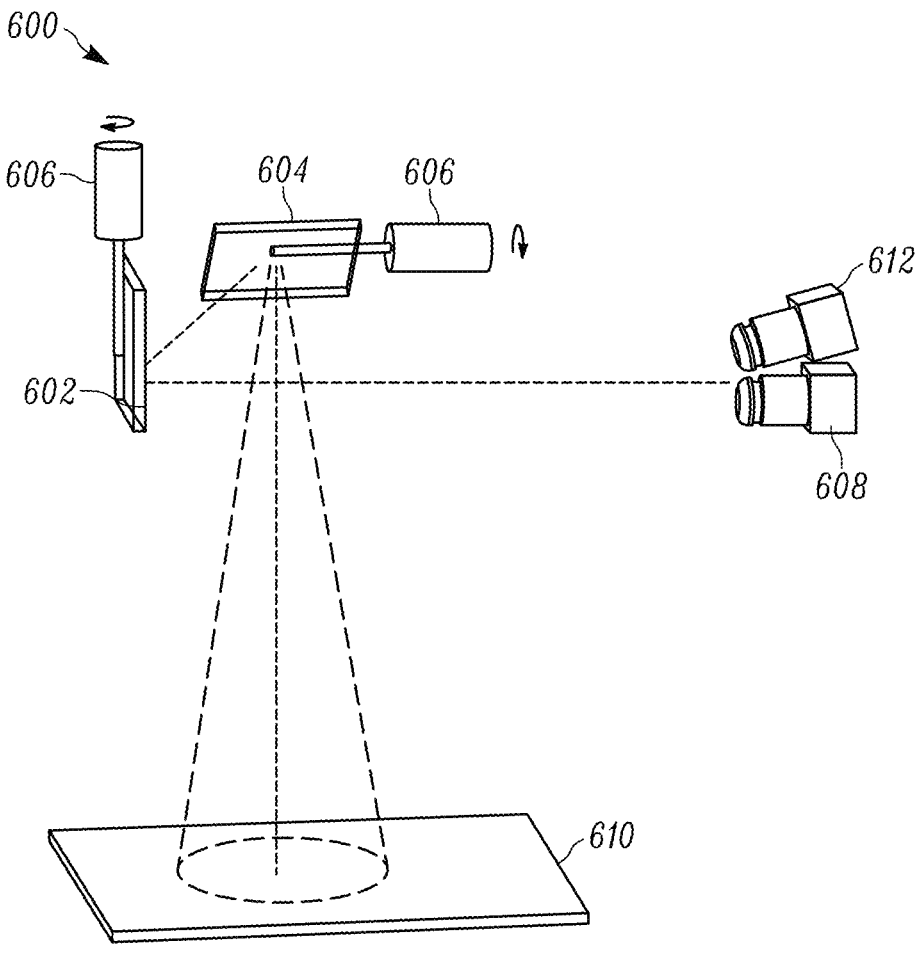
FIG. 6 illustrates a known LIDAR system with multiple moving parts.

FIG. 6 illustrates a known LIDAR system 600 with multiple moving parts. The system 600 uses a first 602 and second mirror 604 mounted on an X-Y galvanometer 606 that scans the environment in both a vertical and a horizontal direction. Light from a laser transmitter 608, which typically includes one or two lasers, reflects off the first mirror 602 onto the second mirror 604, and the combination of the two mirrors 602, 604 determines the projection angle. One or two lasers are typically used in these systems, instead of larger laser arrays like in rotating LIDAR systems, because of the physical difficulty of aligning multiple lasers/receivers onto the mirror system without substantial optical losses and complexity. The transmitted light reflects off a target at the image plane 610 and a receiver 612 is configured to have a field-of-view overlapping with the target at the image plane 610 so that the receiver 612 captures the reflected light. The size and physical orientation of the mirror place various mechanical constraints on the design. For example, the size of the mirrors constrains the amount of reflected light that can be gathered, acting as an effective maximum aperture. Mirror size also impacts the performance, with tradeoffs in power consumption, scanning speed, and system performance.

Figure 7A:
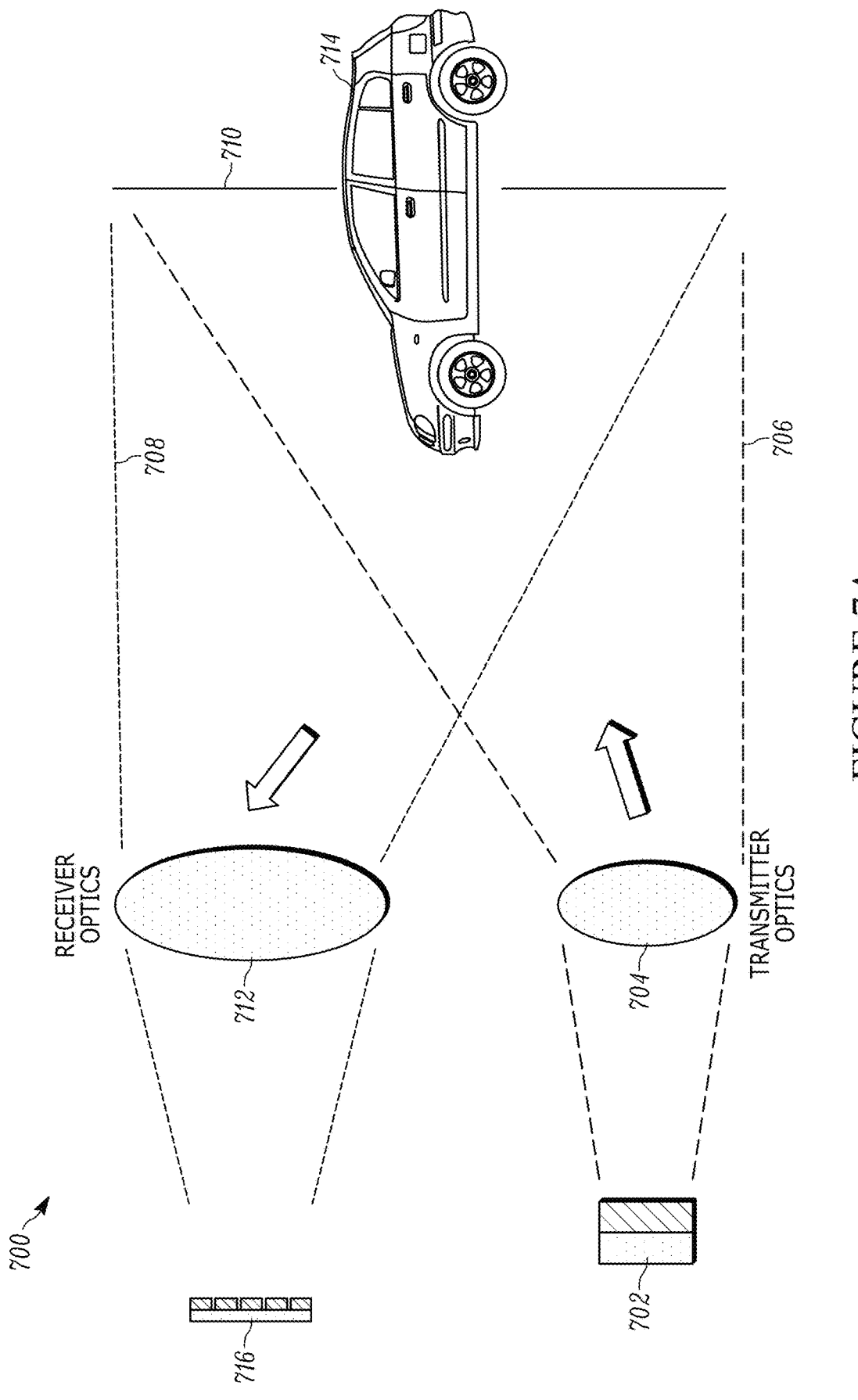
FIG. 7A illustrates a schematic diagram of a solid-state LIDAR system.

FIG. 7A illustrates a schematic diagram of a solid-state LIDAR system. The transmitter 702 includes a plurality of lasers that can be configured in an array. Each individual laser can be fired independently, with the optical beam emitted by each laser corresponding to a 3D projection angle subtending only a portion of the total system field-of-view. Thus, each laser emitter generates an optical beam when energized (fired) that illuminates a corresponding field-of-view at a target range. The transmitter field-of-view is a combination of the various energized emitter fields-of-view. While some embodiments of the present teaching use laser emitters, it should be understood that other emitters may be used, for example LEDs, or other devices that generate optical beams when energized. In some embodiments of the LIDAR system of present teaching, all of the light beams from the lasers in the laser array share the transmitter optics 704 to produce projected light (illumination) 706. The reflected light 708 from the target range 710 shares the receiver optics 712. In this example, an automobile 714 is shown in the target range 710. One example of a transmitter is described in detail in U.S. Patent Publication No. 2017/0307736 A1, which is assigned to the present assignee. The entire contents of U.S. Patent Publication No. 2017/0307736 A1 are incorporated herein by reference.

The LIDAR system 700 illustrated in FIG. 7A uses a detector array 716 that typically has a fewer number of individual detector elements than the transmitter array has individual lasers. These detectors can be individually controlled such that individual or groups of detectors are activated that detect light over a particular receiver field-of-view at the target range. The receiver field-of-view represents the composite of the activated detector fields-of-view. Activation may include, for example, a controllable shutter in front of the detectors that only passes light from a particular field-of-view at the target range, or biases applied to particular detectors or groups of detectors.

Figure 7B:
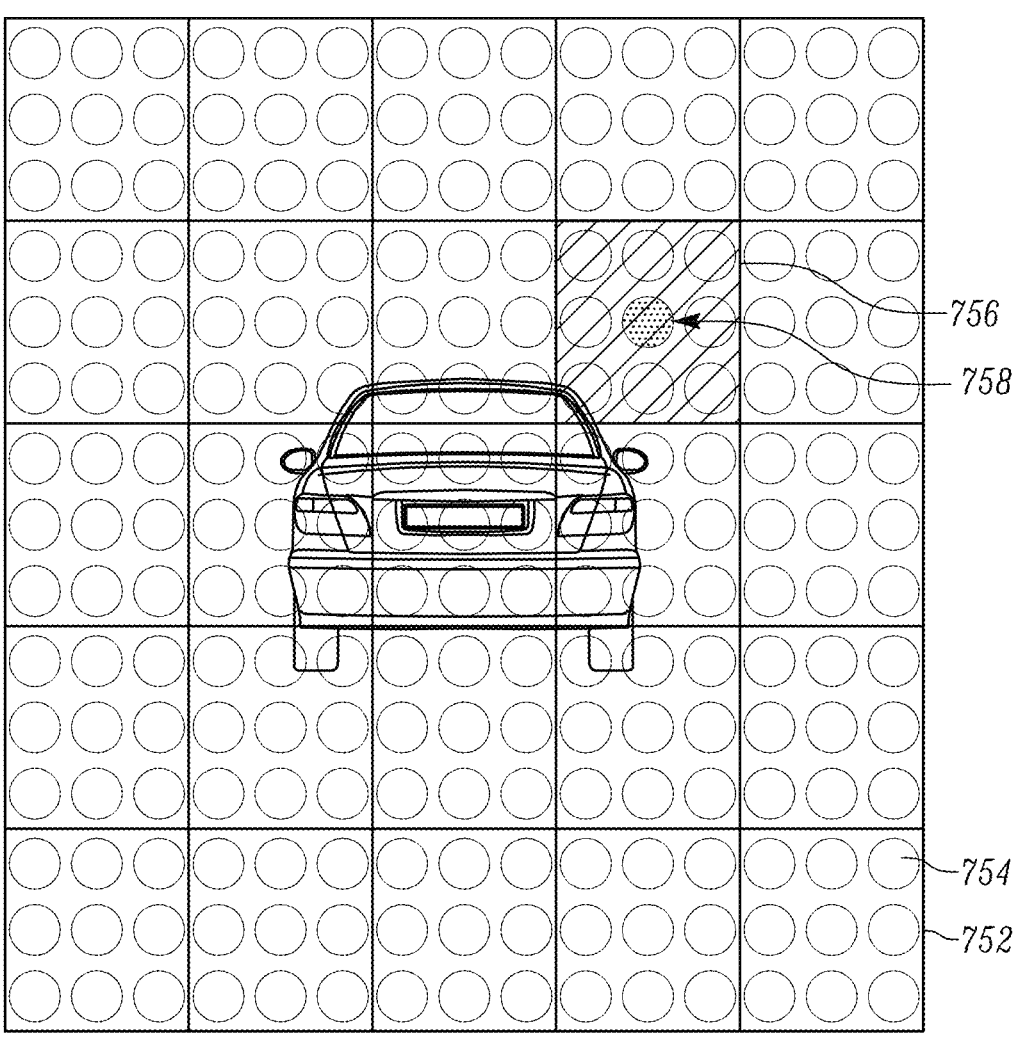
FIG. 7B illustrates a two-dimensional projection of the system field-of-view (FOV) of the LIDAR system of FIG. 7A.

FIG. 7B illustrates a two-dimensional projection of the system field-of-view 750 of the LIDAR system 700 described in connection with FIG. 7A. An individual detector field-of-view of the detector array is shown as a small square 752. An illuminated measurement point associated with an individual laser that is energized in the transmitter is illustrated by a circle 754.

In FIG. 7B, the ratio of the number of detectors (i.e. number of small squares 752) to the number of lasers (i.e. number of circles 754) in each array is one to nine. In the particular example shown in FIG. 7B, the detector array is a 5×5 array. Compared to a prior art flash LIDAR system with equivalent angular resolution, the cost of the detector array can be significantly lower because the number of detectors required can be significantly lower. The measurement resolution of the system in FIG. 7A is not determined by the size of the detector elements, but instead is determined by the number of lasers in the transmitter and the collimation of the individual laser beams. These parameters translate in a known way to the size of the circle 754 at the target range, and the relative size of the circles 754 and the squares 752 that represent field-of-view of a detector element.

FIG. 7B illustrates a critical aspect of the LIDAR system of FIG. 7A. A single 3D measurement point in the overall field-of-view of the LIDAR system of FIG. 7A is highlighted by hash marks in a particular square 756, with that measurement point shown as particular dark circle 758, which corresponds to a specific individual laser in the laser array. It can be further seen in FIG. 7B that this measurement point falls within an individual detector where the field-of-view of that individual detector has been shown with a cross-hatch pattern for identification. This figure illustrates that the 3D resolution of the LIDAR system 700 is determined by the number of lasers, as each laser corresponds to a specific angular projection angle that gives rise to the size of the circles 754 at the target range, and the relative size of the circles 754 and the squares 752 that represent the field-of-view of a detector element.

One feature of the present teaching is that the LIDAR modules are solid-state with no moving parts. The LIDAR modules incorporate a plurality of lasers with each laser generating an optical beam with a fixed projection angle. The resulting composite field-of-view and the angular resolution of the LIDAR system, which includes one or more modules, are determined by the arrangement of optics and lasers and modules. The lasers in each module are grouped into 2D arrays, that when combined with corresponding optics, are positioned to both provide the desired module composite field-of-view, as well as the desired module angular resolution. Each individual laser generates an optical beam that corresponds to a single pointing angle. The angular resolution can be achieved by interleaving the field-of-view of two or more 2D laser arrays. When two fields-of-view generated by two separate 2D laser arrays are overlapped in space, a resulting composite field-of-view is generated with finer angular resolution.

The physical size of a LIDAR system is important for integration into the autonomous vehicle. Although current state-of-the-art systems are generally bulky, and often mounted on roof racks, the goal is to eventually integrate LIDAR systems into the chassis such that they can be visually seamless with the exterior, and cosmetically attractive. There are certain components, such as the headlights, where synergies can be gained by co-packaging with part or all of the LIDAR system. One aspect of the LIDAR system described herein is that it can be separated into small, modular components to support the desire to make LIDAR unobtrusive visually in the future.

Figure 8A:
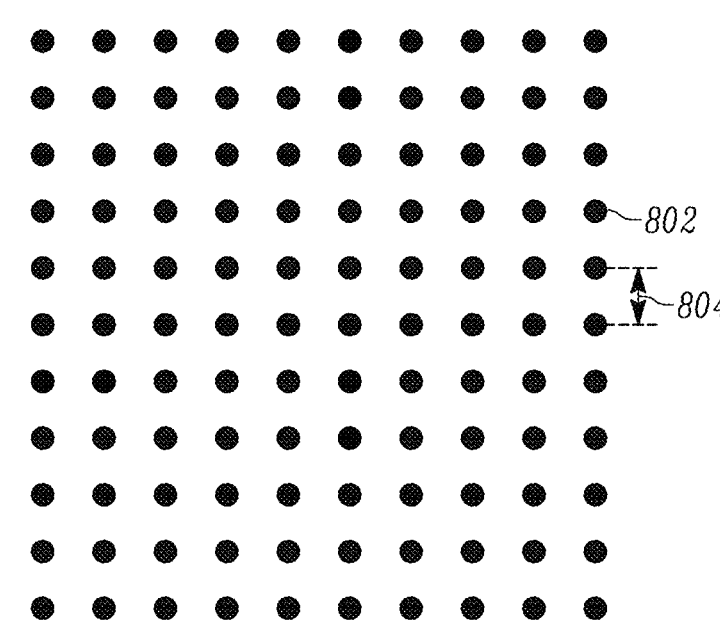
FIG. 8A illustrates a measurement point cloud for a LIDAR system according to the present teaching with a single 2D laser array source illuminating a field-of-view.

FIG. 8A illustrates a measurement point cloud 800 for a single 2D laser array source illuminating a field-of-view. Each measurement point 802 represents a measurement signal based on light emitted by a particular laser element in the array. The distance 804 between the vertical spacing of the measurement points 802 determines the vertical angular resolution. The horizontal spacing 806 of the points 802 on the point cloud determines the horizontal angular resolution of the point cloud 800.

Figure 8B:
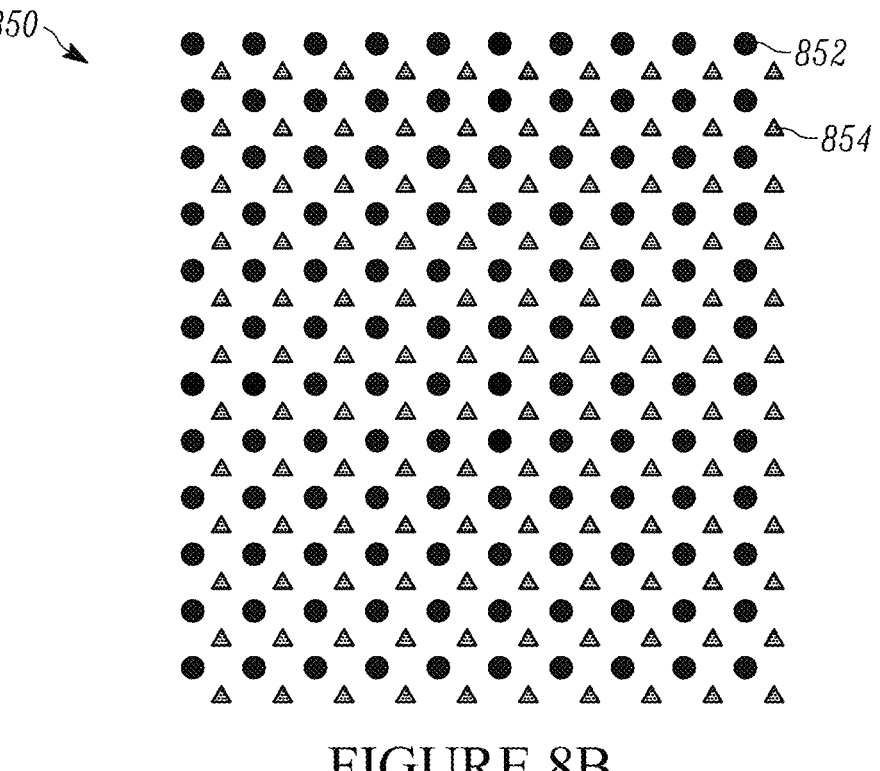
FIG. 8B illustrates a measurement point cloud for a LIDAR system according to the present teaching with two 2D laser array sources illuminating a field-of-view.

FIG. 8B illustrates a measurement point cloud 850 for an embodiment of the present teaching where the illumination of a second 2D laser array has been projected to substantially overlap with a first 2D laser array. A measurement point 852 corresponding to the first 2D VCSEL array is shown as a circle, a measurement point 854 from the second 2D VCSEL array is shown as a triangle. The composite point cloud 850 is formed by the interleaving of the field-of-view of the two separate 2D arrays in order to achieve a finer angular resolution in the horizontal, vertical, or a combination of horizontal and vertical directions. One example of such a transmitter is described U.S. patent application Ser. No. 62/538,149, entitled "VCSEL Array LIDAR With Small Angular Divergence", which is assigned to the present assignee. The entire contents of U.S. Patent Application 62/538,149 are incorporated herein by reference.

A LIDAR system of the present teaching can utilize substantially more lasers than a prior art mechanically scanning LIDAR system since each laser corresponds to a specific projection angle. For example, if an autonomous vehicle requires the full 360° horizontal field-of-view, with a uniform vertical field-of-view of 20°, and the average angular resolution in both direction is 0.5°, then the number of lasers required equals 28,800. Not all types of lasers can be implemented in a practical manner for a LIDAR system that requires thousands of individual lasers. In practice, various embodiments of the LIDAR system of the present teaching that require large numbers of lasers will likely use 2D arrays of vertical cavity surface emitting lasers (VCSEL) due to their current size, cost, and performance capabilities. However, other kinds of transmitter arrays can also be used. One skilled in the will appreciate that numerous types of lasers can be used in the LIDAR systems according to the present teaching.

Figure 9:
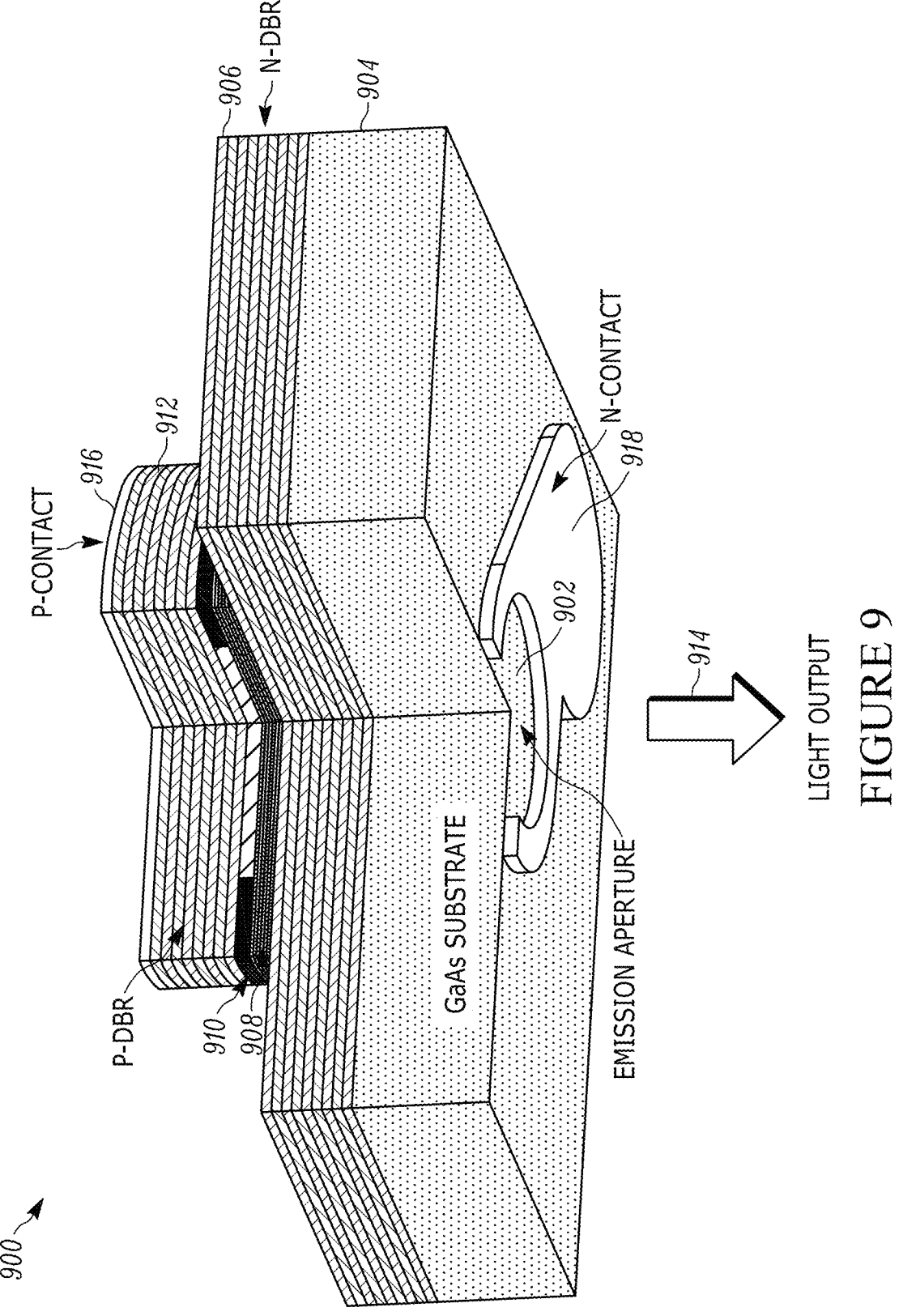
FIG. 9 illustrates a schematic diagram of a cross-section of a structure of a known bottom-emitting VCSEL laser that can be used in a LIDAR system of the present teaching.

One feature of the present teaching is that it can use a variety of known VCSEL devices, including top-emitting VCSELs, bottom-emitting VCSELS, and various types of high-power VCSELs. FIG. 9 illustrates a schematic diagram of a cross-section of a structure of a known bottom-emitting VCSEL laser 900 that can be used in a LIDAR system of the present teaching. The area of the emission aperture 902 of the VCSEL laser 900 typically ranges from a few microns in diameter for mW power operation, up to 100 microns diameter or more for 100 mW and greater CW power operation. The VCSEL 900 is fabricated on a substrate 904 that can be, for example, GaAs, or numerous other semiconductor materials. An n-type distributed Bragg reflector (DBR) layer 906 is positioned on the substrate. An active region 908 is constructed on the n-type DBR layer 906, followed by an aperture that can be made formed in an oxide material. A p-type Distributed Bragg Grating DBR layer 912 is then grown on the active region. Typically, the p-type DBR is highly reflecting, and the n-type DBR is partially reflecting, resulting in light output 914 from the bottom, substrate-side of the layer structure. The active region 908, oxide aperture 910, and p-type DBR layer 912 are formed in a mesa structure. A top contact 916 and a bottom contact 918 are used to provide an electrical current to the active region to generate the output light. An oxide aperture 910 provides current confinement to the active region 908. The top contact 916 is p-type, and the bottom contact 918 is n-type. Emission apertures 902 are formed in the bottom contact 918 to allow the output light 914 to emerge from the bottom, substrate side of the bottom-emitting VCSEL. Note that only one emission aperture 902 is shown in FIG. 9 which illustrates one element of a multi-element array. This type of VCSEL 900 may be a single element, or multiple element VCSEL that can be fabricated as one- or two-dimensional arrays on the substrate 904.

In some embodiments, the VCSEL array is monolithic and the lasers all share a common substrate. A variety of common substrate types can be used. For example, the common substrate can be a semiconductor material. The common substrate can also include a ceramic material. In some embodiments, the 2D VCSEL array is assembled from a group of 1D laser bars.

In some embodiments, the VCSELs are top-emitting VCSELS. In other embodiments, the VCSELs are bottom-emitting VCSELS. The individual VCSELS can have either a single large emission aperture, or the individual VCSELS can be formed from two or more sub-apertures within a larger effective emission diameter. A group of sub-apertures forming a larger effective emission region is sometimes referred to as a cluster. The contacts on the VCSELS can connect a drive signal to one or more individual elements, or all the elements, or subsets of elements to provide various different illumination patterns when one or more electrical drive signals are supplied to the contacts.

Figure 10:
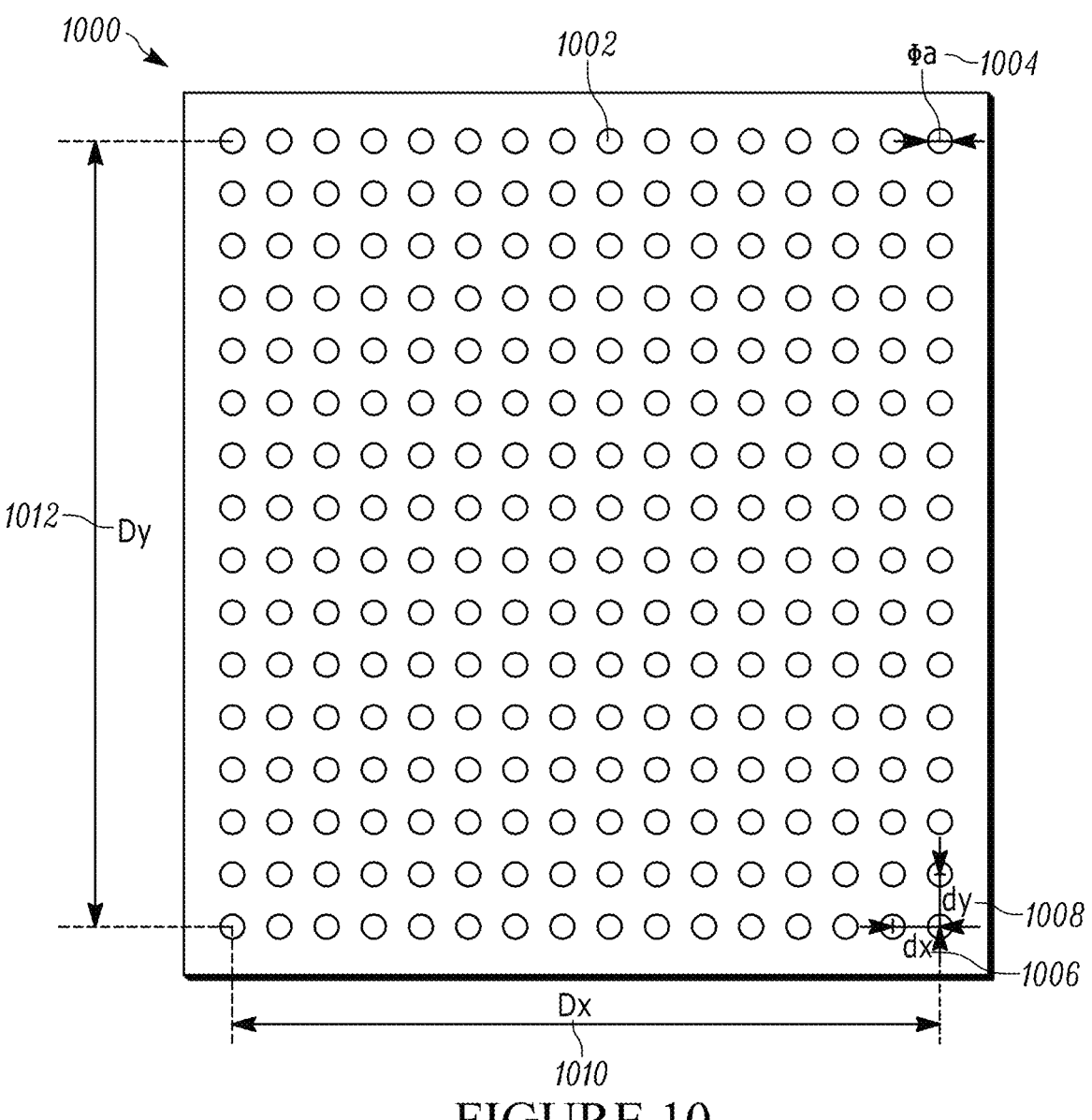
FIG. 10 illustrates a schematic diagram of an embodiment of a 2D monolithic VCSEL array with 256 separate laser emitters according to the present teaching.

FIG. 10 illustrates a schematic diagram of an embodiment of a 2D monolithic VCSEL array 1000 with 256 separate laser emitters 1002 according to the present teaching. Each laser emitter 1002 has an emission aperture of diameter "a" 1004. Emission from each single laser emitter 1002 substantially fills the full emission aperture. Each laser emitter 1002, therefore, generates a laser beam with initial diameter "a" which is equal to the diameter 1004 of the emission aperture. The laser emitters 1002 are spaced uniformly in the horizontal direction with a spacing dx 1006. The laser emitters are spaced uniformly in the vertical direction with a spacing dy 1008. The overall size of the array, measured from the centers of the outermost lasers is distance Dx 1010 in the horizontal direction and distance Dy 1012 in the vertical direction. The actual chip size will be slightly larger than in dimension than the distance Dx 1010 and the distance Dy 1012. In various embodiments, the emitters 1002 may produce beams with various shapes other than the circular emitter shape. For example, oval, square, rectangular and various odd shapes may be realized in various embodiments. In embodiments in which lasers are arranged as 2D arrays, the rows and columns of the lasers can be driven electrically in a matrix addressable fashion.

Some embodiments of the present teaching utilize bottom-emitting high-power arrays of VCSELs with a single large aperture per laser, such as the configuration shown in FIG. 9. Other embodiments of the present teaching utilize top-emitting or bottom-emitting high-power arrays of VCSELs with an overall emission area comprising sub-apertures. However, one skilled in the art will appreciate that the present teaching is not limited to any single configurations of top- and bottom-emitting VCSELs and associated emission apertures.

The use of 2D VCSEL arrays as a building block of the LIDAR systems described herein, establishes a platform that allows a small physical size for the transmitter. A typical 2D array with 256 high-power individual lasers, would be possible on with a monolithic chip of ~4 mm×4 mm. The laser 2D array is then used together with optics that are chosen to keep the physical dimension as small as possible, for example through the use of micro-lens arrays, shared lenses of dimension<20 mm, or diffractive optics of maximum dimension of 20 mm as examples.

Figure 11:
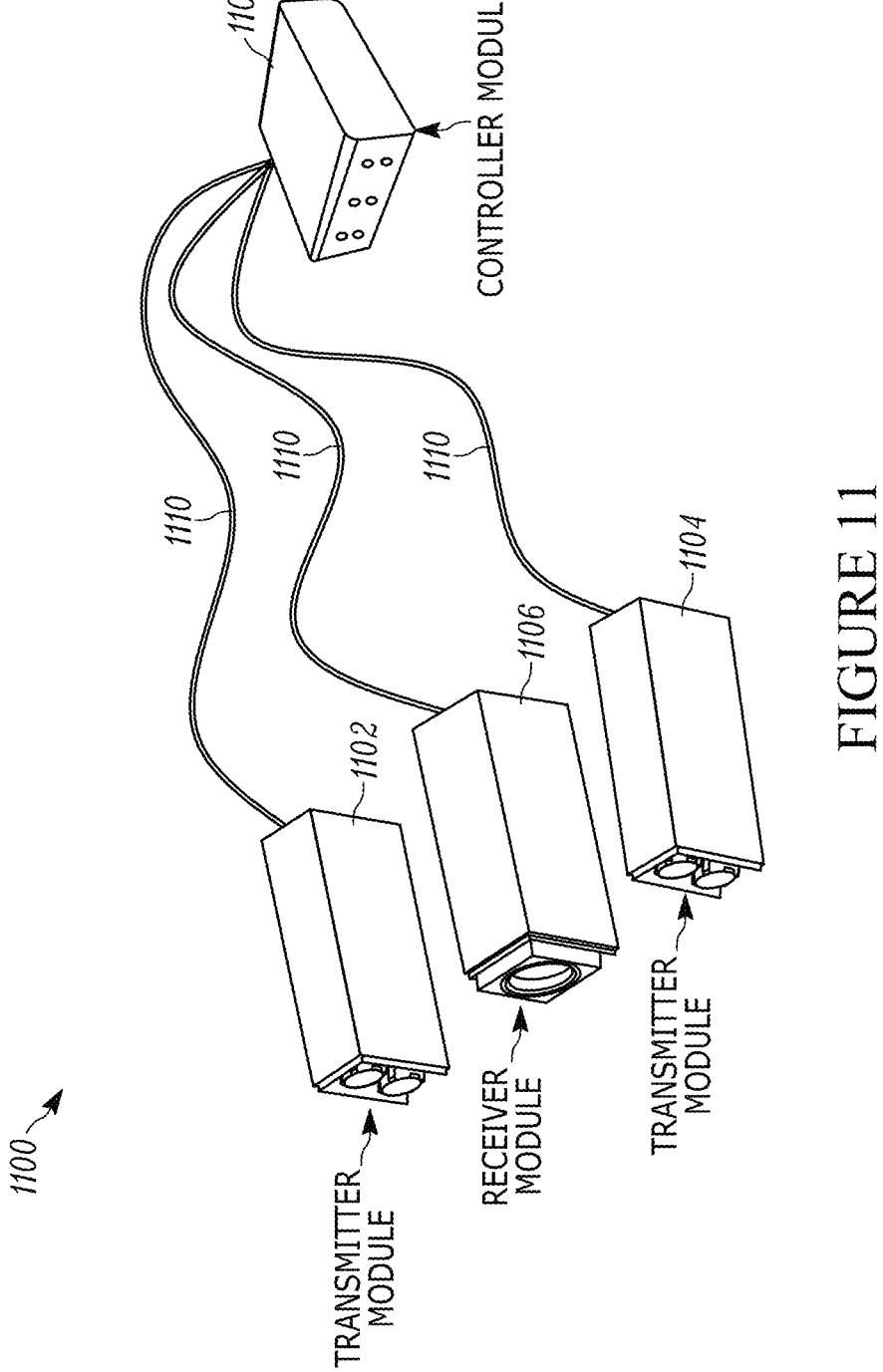
FIG. 11 illustrates a schematic diagram of an embodiment of a modular LIDAR system according to the present teaching that includes a separate transmit module and receive module.

FIG. 11 illustrates a schematic diagram of an embodiment of a modular LIDAR system 1100 according to the present teaching that includes a single transmitter and single receiver per module. The transmitter, receiver, and controller are physically separate modules 1102, 1104, 1106, 1108. There are two transmitter modules 1102, 1104, a receiver module 1106 and a controller module 1108. Connections 1110 exist between the modules 1102, 1104, 1106, 1108 for provision of electrical power, and communication between the controller module 1108 and the other modules 1102, 1104, 1106. Communication between the modules 1102, 1104, 1106, 1108 could take place either optically or electrically, and they may use a variety of communication protocols, including Ethernet or other various other communication protocols. Power to the transmitter and receiver modules 1102, 1104, 1106, could be supplied through the controller module 1108 as shown, or can be supplied separately. The modular LIDAR system 1100 is a relatively simple configuration, including only two transmitter modules 1102, 1104 and a single receiver module 1106. In other embodiments, a single controller module 1108 is used control one or more transmitters and/or one or more receivers.

Figure 12:
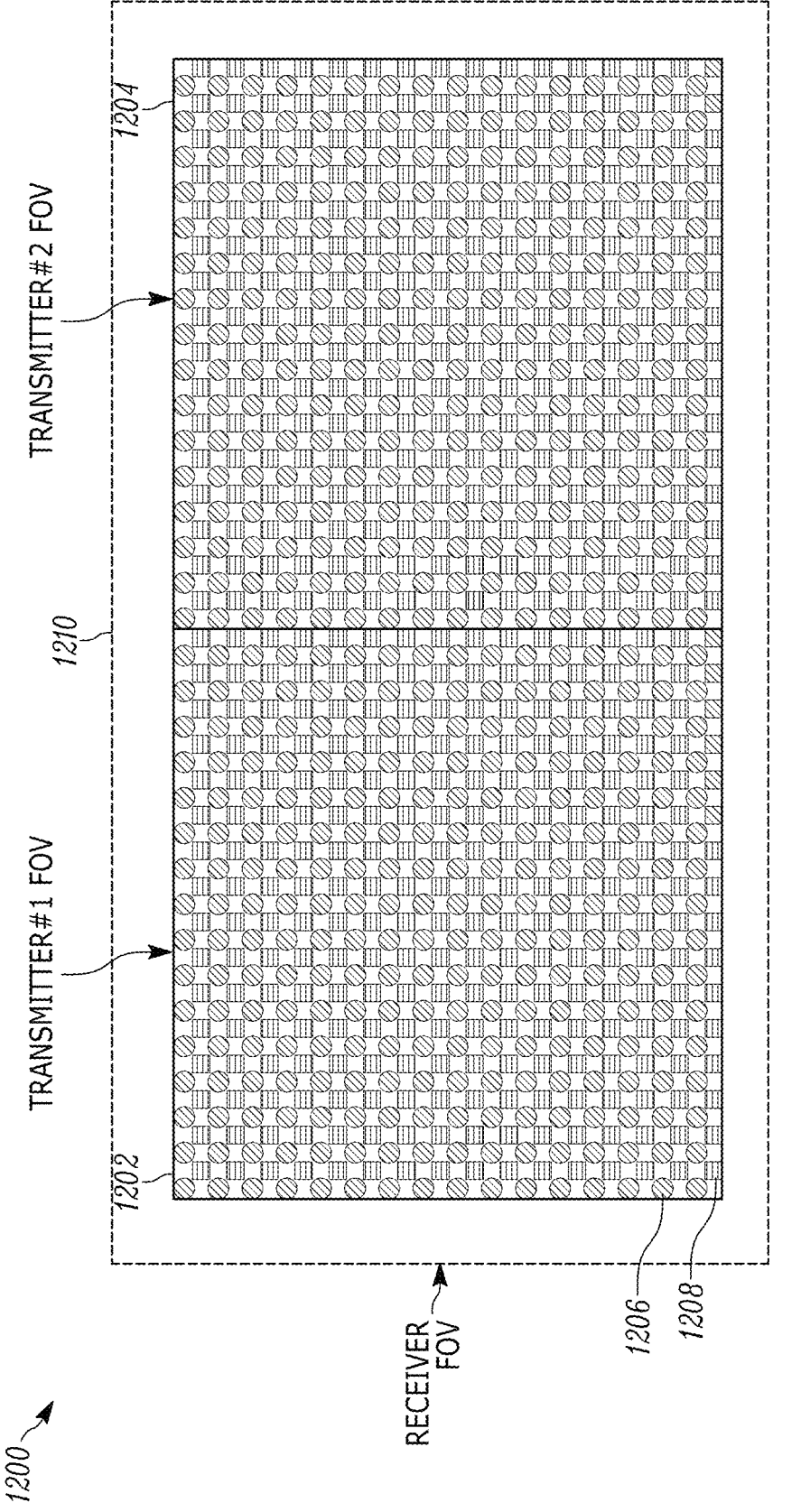
FIG. 12 illustrates an embodiment of a composite FOV generated by the modular LIDAR system of FIG. 11.

FIG. 12 illustrates an embodiment of an example composite field-of-view 1200 that is generated by the modular LIDAR system 1100 described in connection with FIG. 11. Referring to both FIGS. 11 and 12, there is a region representing field-of-view 1202 for one transmitter module 1102 and a region representing field-of-view 1204 for the other transmitter module 1104. As previously described, each transmitter module 1102, 1104 uses at least two 2D laser arrays that are substantially overlapped in the field-of-view to produce a finer angular measurement resolution. The field-of-view for individual laser elements from the first array is illustrated by circles 1206. The field-of-view for individual laser elements from the second array is illustrated by squares 1208. As shown in the figure, there are two 16×16 arrays of 256 lasers in each transmit module 1102, 1104. They produce the substantially overlapped fields-of-view shown by the close-packed arrays of corresponding circles 1206 and squares 1208. The dual-array configuration for both modules 1102, 1104 is the same in this embodiment. Also, the fields-of-view 1202, 1204 for the corresponding transmitters are configured to sit side-by-side at the target range.

The total composite field-of-view of the two transmitters is made up of 1,024 laser fields-of-view. In some embodiments, the emission wavelengths of laser arrays in the first transmit module 1102 and the second transmit module 1104 are not the same. Also, in some embodiments, the laser wavelengths within a single transmitter module 1102, 1104 is not the same. For example, each laser array may emit at a different wavelength. In this configuration, the laser fields-of-view represented by circles 1206 could be different in wavelength from the laser fields-of-view represented by squares 1208. In general, there is no limitation on the number and distribution of wavelengths within either arrays or modules. The number and positions of the different laser wavelengths is chosen based on a desired effect on the field-of-view at the measurement target range. For composite field-of-view 1200 a field-of-view of the single receiver module is shown by the dashed box 1210, which is slightly larger than the field-of-view of the combined transmitter fields-of-view 1202, 1204. In some embodiments, the receiver field-of-view 1210 comprises multiple detector fields-of-view from multiple detectors that are configured as an array. It is typically desired to have the receiver field-of-view 1210 slightly larger than the transmitter fields-of-view 1202, 1204 to simplify alignment of the receiver and transmitter fields-of-view.

The controller module 1108 manages the operation of the two transmitter modules 1102, 1104 to minimize optical cross-talk, as well as optical power levels for eye safe operation. The controller module 1108 also manages the receiver module 1106 which, in some embodiments uses at least one 2D array of detectors, and in other embodiments, uses a plurality of 2D arrays of detectors. The number and position of the various detector arrays are chosen to achieve a particular receive field-of-view at the target range. For example, if two wavelengths are used, then the receiver can have two separate 2D arrays of detector, one for each wavelength.

In general, the transmitter modules of the present teaching include a plurality of laser emitters. Each laser emitter is positioned to illuminate a particular emitter field-of-view at a target range. In various embodiments, the plurality of emitters is positioned in various patterns. For example, the plurality of emitters can be a one- and/or two-dimensional array with a particular spacing between emitters in the vertical and/or horizontal direction. Central to the invention is the fact that individual and/or groups of emitters are positioned to illuminate a particular emitter field-of-view at the target range. This information is typically known by the controller, and is used to produce illumination in particular fields-of-view at the target range by controlling the energizing of individual and/or groups of emitters. The field-of-view of the one or more emitter fields-of-view contained in a particular transmitter that are illuminated based on a signal from the controller at any particular time is referred to as the transmitter field-of-view.

In general, the receiver modules of the present teaching include a plurality of detector elements. Each detector element is positioned to detect light from a particular detector field-of-view at a target range. In various embodiments, the plurality of detectors is positioned in various patterns. For example, the plurality of detectors may be a one- and/or two-dimensional array with a particular spacing between detectors in the vertical and/or horizontal direction. One aspect of the present teaching is the fact that individual and/or groups of detectors can be positioned to detect light from a particular detection field-of-view at the target range. This information on field-of-view can be known by the controller, and is used to detect illumination from particular fields-of-view at the target range by controlling the detectors/receiver such that select detectors are activated to detect light reflected from the target range in the field-of-view of the activated detector or detectors. The field-of-view of the one or more detector fields-of-view contained in a particular receiver that are activated to detect based on a signal from the controller at any particular time is referred to as the receiver field-of-view.

The controller may control the activation of particular detectors by any of a number of known control mechanisms. For example, a controllable aperture may be used to control the activation of one or more detector fields-of-view in a receiver field-of-view. Individual detector biases can also be controlled to control the activation of individual detector fields-of-view within a receive field-of-view.

Overlap regions between different transmitters and/or different receivers are often designed into the system to provide continuous tracking of objects across particular composite fields-of-view. For example, a continuous composite field-of-view is provided by two transmitters when at least some of the fields-of-view of the emitters of each transmitter overlap to some degree. Furthermore, a continuous transmit receive composite field-of-view is provided when at least one detector field-of-view is overlapped with the overlapped emitter fields-of-view. Overlap of at least some individual detector fields-of-view from two receivers is also used to provide a continuous composite receive field-of-view across two different receivers.

In the overlap regions, a controller is used to achieve performance objectives from the system. For example, the controller can control energizing select emitters that generate optical beams with the fields-of-view that overlap at the target range so that only one emitter from each of two overlapped transmitters generate an optical beam that when reflected off the object at the target range is detected by one of the optical detectors during a particular light detection and ranging measurement. This eliminates or substantially reduces cross talk, especially of those transmitters operating at the same wavelength.

One feature of the present teaching is that the controlling of the emitters and detectors can be used to support performance of a modular LIDAR system. The controller has the information about various FOV positions as well as ability to control energizing of individual and groups of laser emitters and to control activation of individual detectors. The knowledge can extend beyond an individual transmitter and/or receiver to include all the connected modules. As such, the controller is able to provide a particular transmitter field-of-view and a particular receiver field-of-view at any particular time and/or for any desired measurement sequence at the target range from all connected transmit, receive, and/or transmit/receive modules. If different wavelengths are used within single transmitters or across multiple transmitters, the details of the transmission and detection for the multiple wavelengths is typically known and also actively managed by the controller.

In some embodiments of the LIDAR system of the present teaching, the receiver can detect different wavelengths separately. In these embodiments, the laser emitters can be simultaneously energized in an overlapping field-of-view, thereby allowing simultaneous measurements and improved angular resolution, as described in connection with FIG. 8B. One aspect of the present teaching is the realization that configuring the LIDAR system with a controller that has the ability to control the energizing of particular emitters and the activation of particular detectors provides the designer with control over a number of important performance parameters of the system. For example, the controller can be configured to control energizing of transmitters such that the illumination at a target range does not exceed an eye-safe Maximum Permissible Exposure (MPE) limit for optical power in a particular aperture size. Maximum Permissible Exposure can be exceeded, for example, if two or more emitter fields-of-view overlap such that the sum of the optical power within an aperture defined by eye safety standards is too high.

The controller can also be configured to control the transmitter emitters and the receiver detectors such that a one-to-one correspondence is maintained between an energized emitter and a detector configured to detect. The controller can control the transmitter emitters and the receiver detectors such that a one-to-one correspondence is maintained between an energized transmitter field-of-view from a group of emitters and a receiver field-of-view from a group of detectors configured to detect. The controller can also be configured to control the energizing of emitters and/or the detecting of detectors to improve various performance metrics, such as reducing measurement cross talk. For example, measurement cross talk can arise when a field-of-view of more than one emitter overlaps with a detector and/or receiver field-of-view. These overlap regions are often designed into the system to provide continuous tracking of objects across a composite field-of-view. That is, a continuous composite field-of-view is provided by two transmitters when at least some of the fields-of-view of the emitters of each transmitter overlap to some degree. Further, at least one detector field-of-view is overlapped with the emitter fields-of-view. In general, overlap of at least some individual detector fields-of-view from two receivers is also used to provide a continuous composite field-of-view across two different receivers.

In addition, the controller can be configured to control the energizing of emitters and/or the activation of detectors to produce a desired and/or varying angular resolution at the target range. The controller can also be configured to control the energizing of emitters and/or the activation of detectors to track an object across a composite field-of-view. The composite field-of-view can be provided by one or more transmitters, one or more receivers, and/or one or more modules that form the modular LIDAR system.

Figure 13:
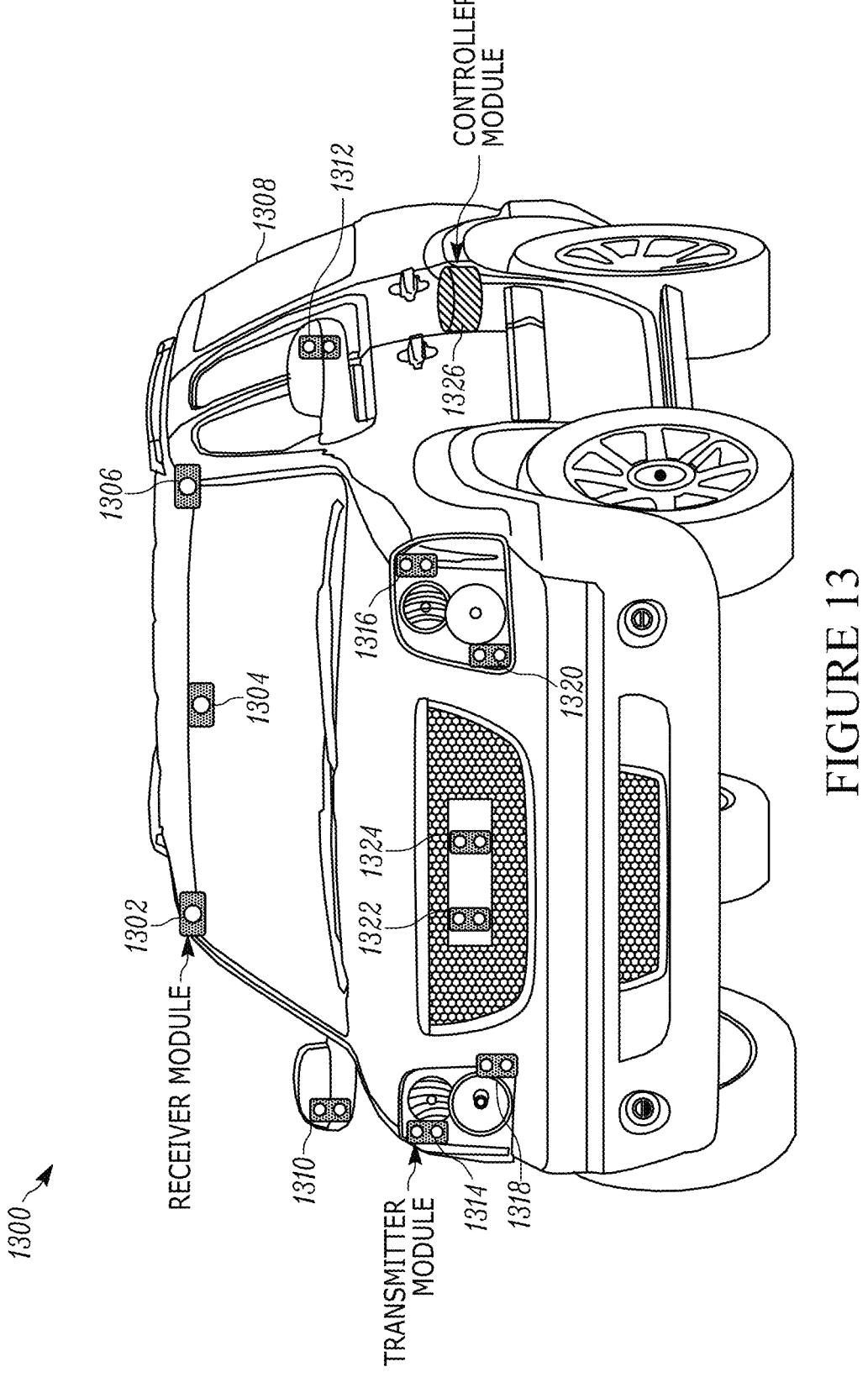
FIG. 13 illustrates an autonomous car integrated with an embodiment of a modular LIDAR system of the present teaching.

One feature of the modular approach to LIDAR system design according to the present teaching is the ability to easily integrate the various modules into an autonomous vehicle. FIG. 13 illustrates an autonomous car integrated with an embodiment of a modular LIDAR system 1300 according to the present teaching. Three receiver modules 1302, 1304, 1306 are depicted near the roof of the car 1306. Eight transmitter modules 1310, 1312, 1314, 1316, 1318, 1320, 1322, 1324 are shown, located in various areas, such as the side mirrors, the headlights, and the grill of the automobile 1308. The controller module 1326, is separately located in the trunk area of the automobile 1308. The ability to have multiple modules of relatively small size allows the location of the transmitters and receives in virtually any location of the automobile 1308, which allows for seamless integration into the vehicle. The controller module 1326 acts to coordinate the operation of the various receiver modules 1302, 1304, 1306 and transmitter modules 1310, 1312, 1314, 1316, 1318, 1320, 1322, 1324 to minimize optical cross-talk, and to control eye safety.

The use of a single controller module 1326 also allows for the smooth tracking of an object crossing in front of the vehicle, since with the solid-state system, the system can control the laser energizing pattern of elements in the laser arrays within various transmitter modules 1310, 1312, 1314, 1316, 1318, 1320, 1322, 1324 to continuously measure an object of interest. As the object crosses the boundary from one transmitter field-of-view to the next transmitter field-of-view, the controller module 1326 can coordinate the transmitter modules 1310, 1312, 1314, 1316, 1318, 1320, 1322, 1324 and the receiver modules 1302, 1304, 1306 to prevent any gap in the measurements. The modular design described herein is also easier to integrate into different types of vehicles as the physical size is relatively small. Known LIDAR systems with a larger single unit that takes up more space might have to be located external to the vehicle, such as shown in the system described in connection with FIG. 5. Clearly, the automobile described in connection with FIG. 5 is impacted aesthetically in an unattractive manner by the need to have a large roof rack with a mechanical rotating LIDAR and will have undesirable air flow dynamics effecting efficiency of the automobile.

One feature of the modular LIDAR systems of the present teaching is the ability to minimize electrical cross-talk between the transmitter and the receiver elements. The lasers used for automotive LIDAR typically are relatively high-power, operating at the limit of eye safety and often require large electrical driving pulse currents to generate optical pulses. The electrical signal from the transmitter, if allowed to electromagnetically couple to the receive circuit, produces excess noise that may provide a false return signal. This is a particularly difficult problem in the case of a LIDAR system that has capability to energize more than one laser pulse, using a different wavelength. In these system configurations, the energizing time of any particular transmit laser can be completely independent of receiver timing. The modular LIDAR systems of the present teaching can separate the transmit and the receive signals to substantially mitigate any electrical cross-talk concern. This separation also can be used improve EMI emissions.

Figure 14:
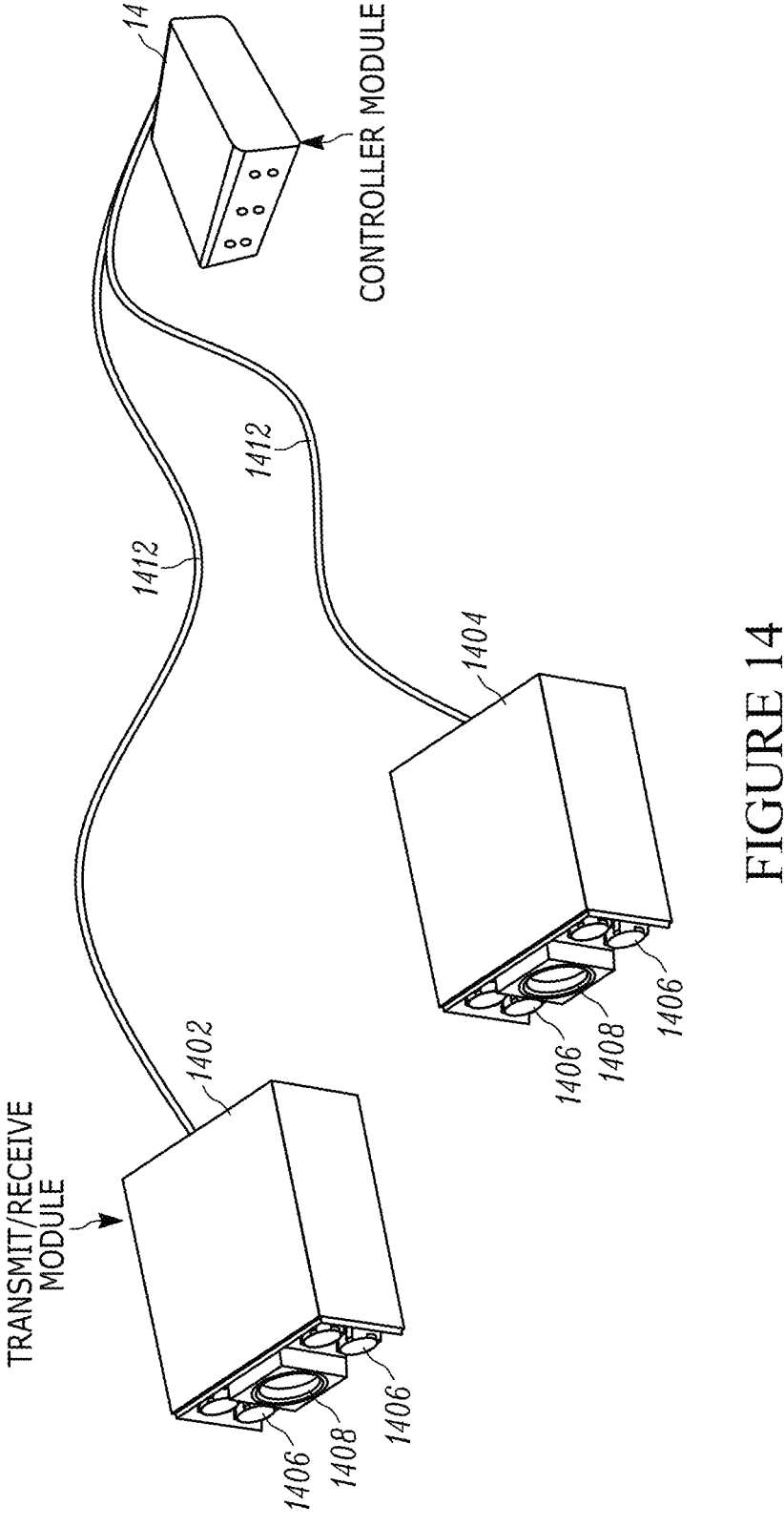
FIG. 14 illustrates a schematic diagram of an embodiment of a modular LIDAR system according to the present teaching that includes a joint transmit/receive module.

FIG. 14 illustrates a schematic diagram of an embodiment of a modular LIDAR system 1400 according to the present teaching that includes multiple transmitters per module. In FIG. 14, one modular unit 1402, 1404 contains several transmitters 1406 and a single receiver 1408. The controller module 1410 is a separate module. Connections exist between the modules using cables 1412 for provision of electrical power and for communication. Communication between the modules 1402, 1404, 1410 could take place either optically or electrically, and in a variety of communication protocols including Ethernet or other communication protocols. Power to the transmit/receive modules could be supplied through the controller module 1410 as shown, or separately.

Figure 15:
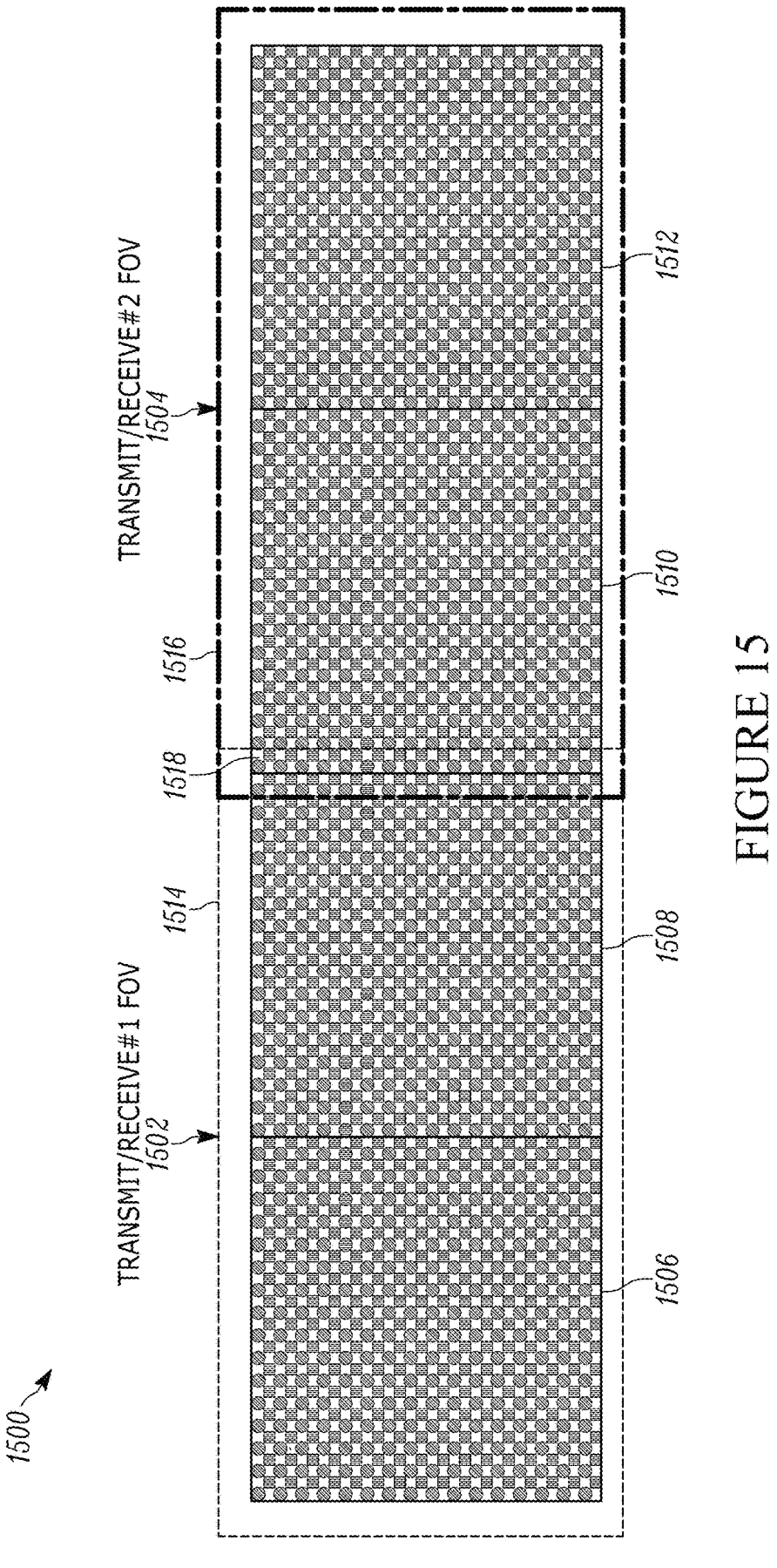
FIG. 15 illustrates an embodiment of a composite field-of-view generated by the modular LIDAR system of FIG. 14.

FIG. 15 illustrates an embodiment of a composite field-of-view 1500 generated by the modular LIDAR system 1400 of FIG. 14. Referring to both FIGS. 14 and 15, there is a field-of-view 1502 generated for the transmit/receive module 1402, and a field-of-view 1504 generated for the transmit/receive module 1404. Each of these fields-of-view 1502, 1504 include transmit fields-of-view 1506, 1508, 1510, 1512 for each the two transmitters in each module 1402, 1404 and receive fields-of-view 1514, 1516 for each receiver in each module 1402, 1404. The transmit/receive field-of-view 1502, 1504 for each module 1402, 1404 is nominally the same as that shown in FIG. 12, and includes fields-of-view for each of 1,024 lasers that are substantially overlapped. The composite field-of-view, therefore, has fields-of-view for each of 2,048 lasers. The field-of-view 1500 of the two modules 1402, 1404 has been arranged to provide exactly two times the total field-of-view in the horizontal direction as for one individual unit. In various embodiments, the wavelengths of the two transmit/receive modules can be the same, or can different. One skilled in the art will appreciate that the present teaching is not limited by the number of wavelengths employed by the system. The controller module 1410 operates both transmit-receive modules 1402, 1404 and acts to minimize optical cross-talk between modules and also to maintain eye safety by controlling the laser drive energizing patterns for the transmit arrays.

One feature of the modular LIDAR system of the present teaching is that the composite field-of-view is designed to allow continuous tracking of an object across a field-of-view. Referring to the composite field-of-view 1500 described in connection with FIG. 15, the advantage of continuous tracking is that there are no gaps between the transmit fields-of-view, 1506, 1508, 1510, 1512. However, there are overlaps in the receive fields-of-view 1514, 1516. This produces an overlap region 1518 where both the receive fields-of-view 1514, 1516 can detect light from both transmit fields-of-view 1508, 1510. The controller module 1410 is used to manage the energizing of particular lasers in the transmit arrays that produce light in the overlap region 1518 so that there is only minimal cross-talk. Consequently, the laser light produced in the transmit field-of-view 1510 is minimized in the receive field-of-view 1514. Also, the laser light from the transmit field-of-view 1508 is minimized in the receive field-of-view 1516. In addition, the controller module 1410 manages energizing particular lasers in the transmitter arrays such that a peak power within the composite field-of-view 1500 never exceeds an eye safe threshold power. In addition, the controller controls energizing particular lasers in the transmitter arrays that generate optical beams with the overlap region 1518 at the target range so that only one of the first transmitter in transmit/receive module 1402 and second transmitter in transmit/receive module 1404 generate an optical beam that when reflected off the object at the target range is detected by one of the plurality of optical detectors in only one of the first and second transmit/receive modules 1402, 1404 during a particular light detection and ranging measurement.

Figure 16:
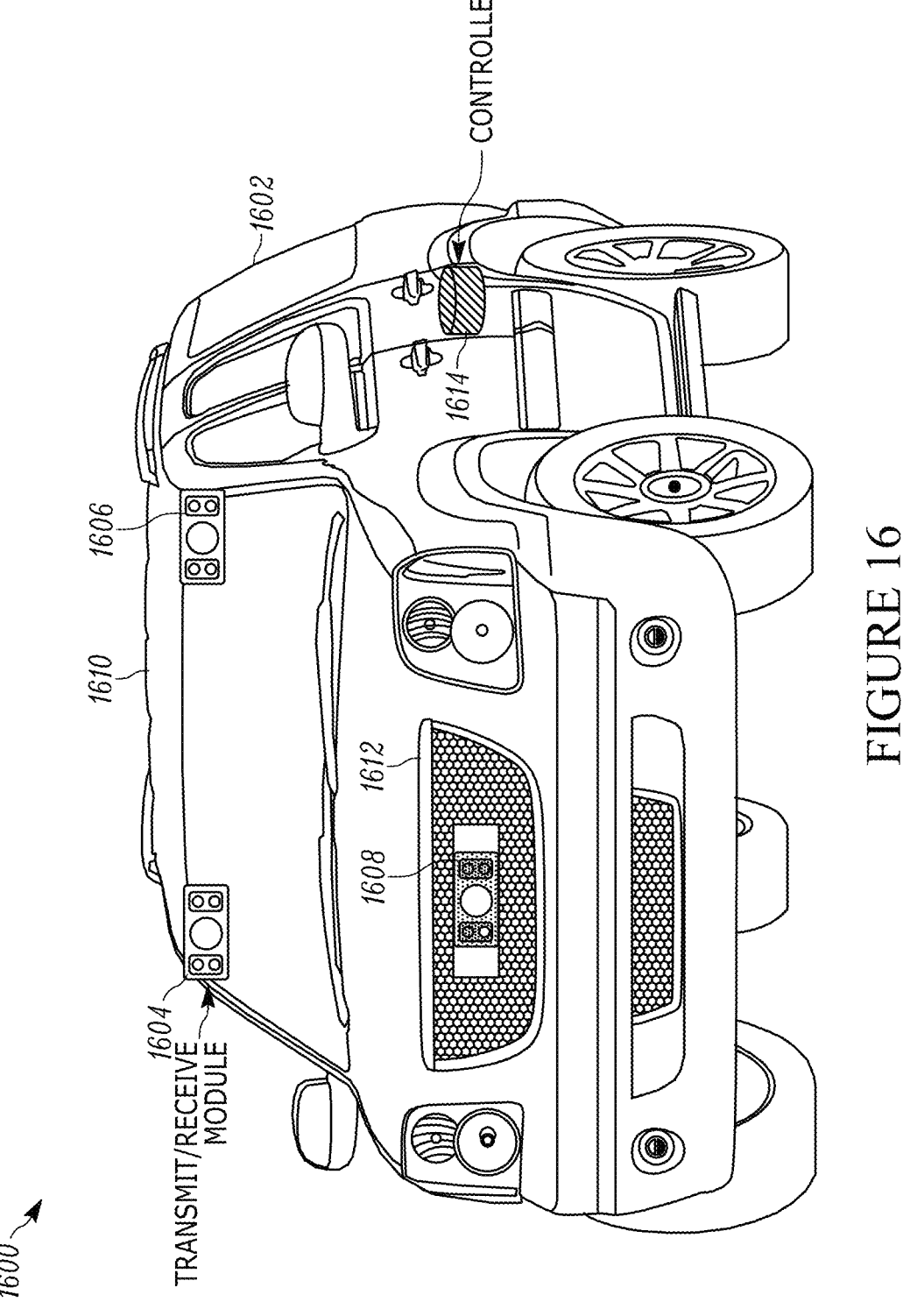
FIG. 16 illustrates an embodiment of a modular LIDAR system according to the present teaching that is integrated into an autonomous vehicle.

FIG. 16 illustrates an embodiment a modular LIDAR system 1600 according to the present teaching that is integrated into an autonomous vehicle 1602. FIG. 16 shows how the modular transmit/receive modules 1604, 1606, 1608 can be positioned on the automobile 1602. The two transmit/receive modules 1604, 1606 are placed close the roof 1610, while a single module 1606 is placed in the grill 1612 of the car 1602. The controller module 1614 is in the trunk of the car 1602. This arrangement allows easier integration into a variety of vehicles, as compared to known large mechanical rotating LIDAR systems.

Figure 17:
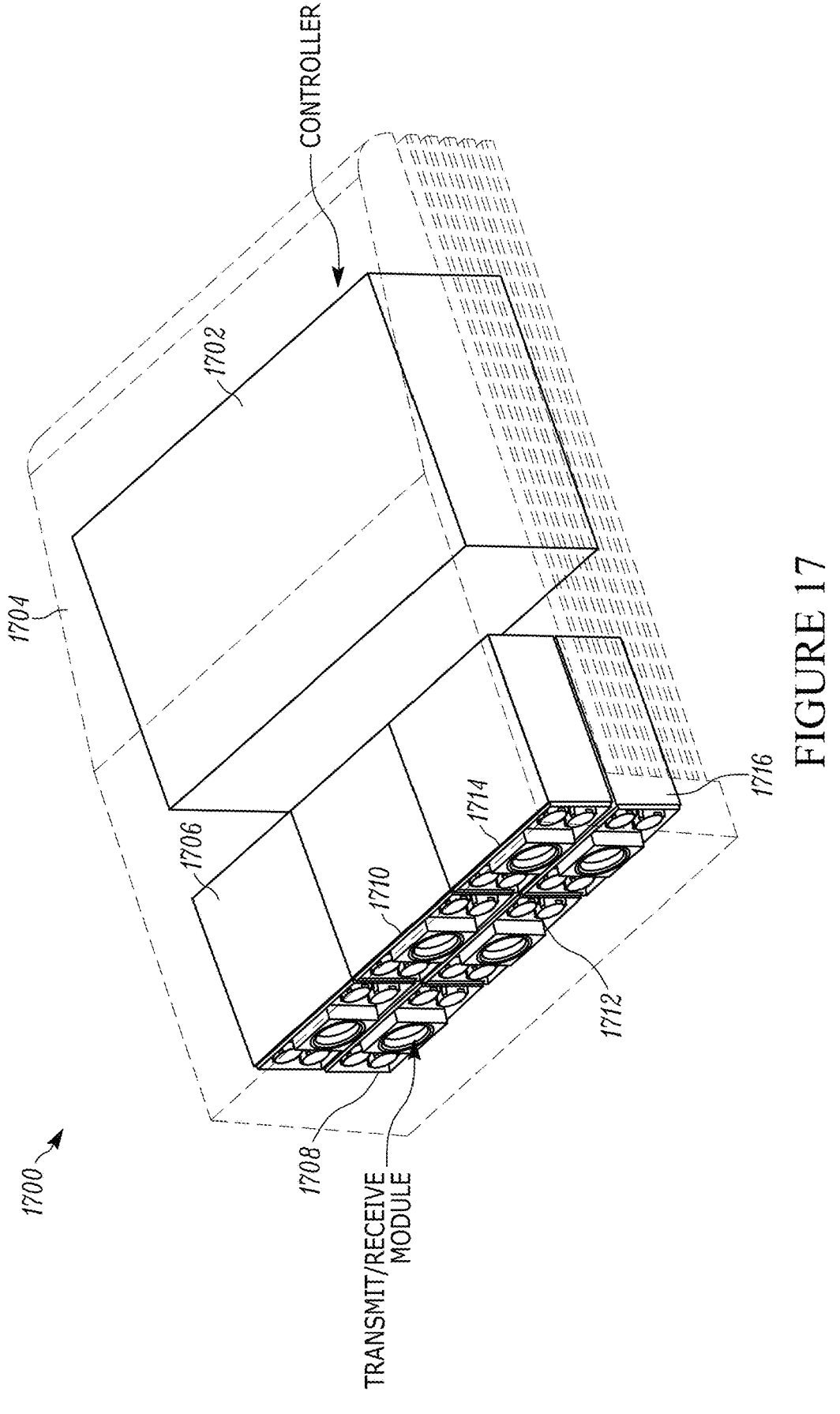
FIG. 17 illustrates a schematic diagram of an embodiment of a modular LIDAR system of the present teaching with co-located controller module.

One feature of the present teaching is that the transmit, receive, and/or transmit/receive modules do not necessarily need to be packaged separately from the controller module. As such, the transmit, receive, and/or transmit/receive modules and controller module do not have to be located in physically different locations. FIG. 17 illustrates a schematic diagram of an embodiment of a modular LIDAR system 1700 of the present teaching with co-located controller module 1702. A single enclosure 1704 is used to group together a set of transmit/receive modules 1706, 1708, 1710, 1712, 1714, 1716 with a single controller module 1702. For example, in the case of a large vehicle, such as a semi-trailer truck or a garbage truck, it might be desired to use a modular system with a single, common enclosure 1704. Such a common enclosure 1704 could provide additional robustness to environmental factors.

Figure 18:
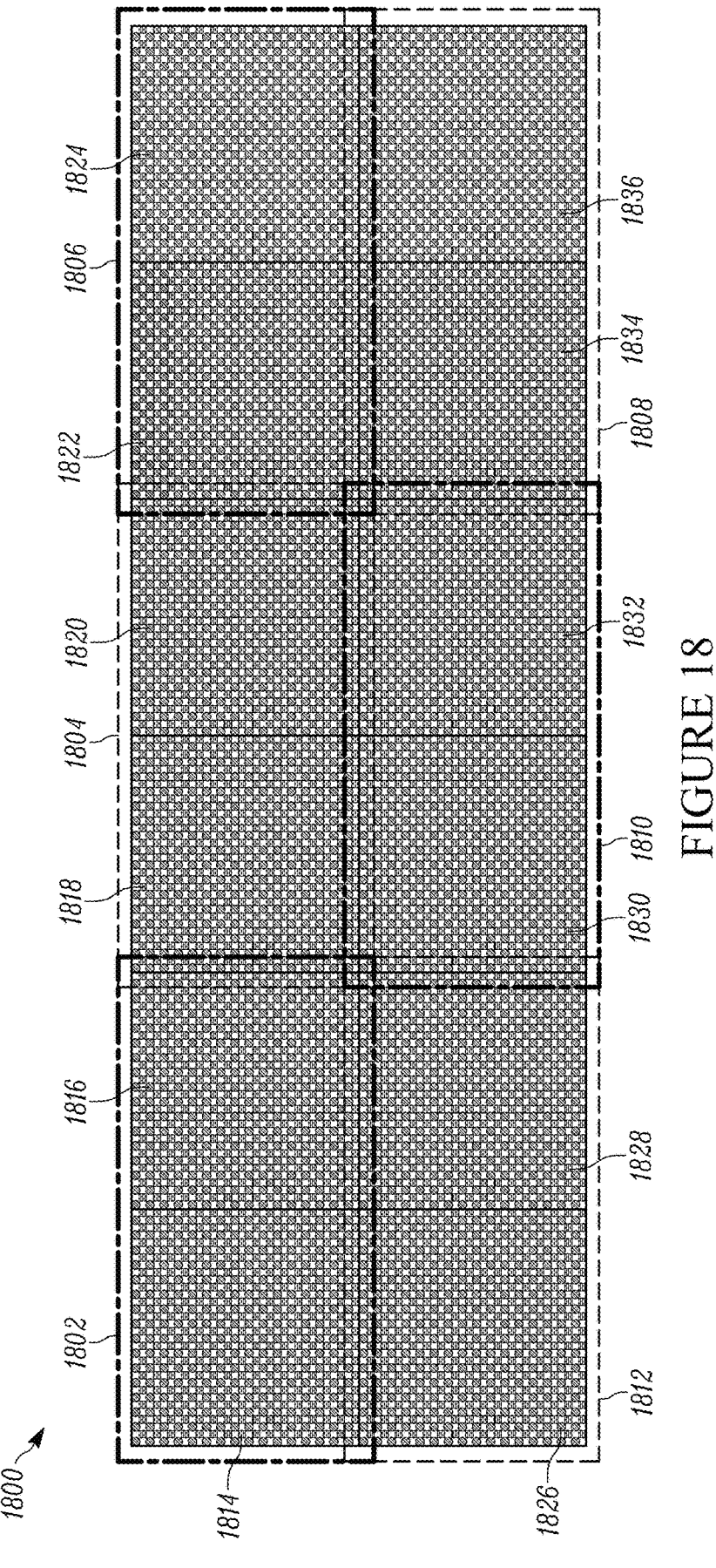
FIG. 18 illustrates an embodiment of a composite field-of-view generated by the modular LIDAR system of FIG. 17.

FIG. 18 illustrates an embodiment of a composite field-of-view 1800 generated by the modular LIDAR system 1700 of FIG. 17. Referring to both FIGS. 17 and 18, each transmit/receive module 1706, 1708, 1710, 1712, 1714, 1716 has a corresponding receive field-of-view 1802, 1804, 1806, 1808, 1810, 1812 and two corresponding transmit field-of-views 1814, 1816, 1818, 1820, 1822, 1824, 1826, 1828, 1830, 1832, 1834, 1836. The transmit/receive modules 1706, 1708, 1710, 1712, 1714, 1716 use twenty-four 2D laser arrays with 256 lasers each. FIG. 18 illustrates that there are multiple overlaps in the receiver fields-of-view 1802, 1804, 1806, 1808, 1810, 1812. The receive field-of-view 1802, 1804, 1806, 1808, 1810, 1812 are shown with different line types to help illustrate the overlap. In this configuration, multiple edges or overlap regions between transmit field-of-views need to be managed in order to avoid optical cross-talk and also to ensure eye safety. The controller module 1702 operates all the transmit/receive modules 1706, 1708, 1710, 1712, 1714, 1716 to ensure safety and performance specifications are satisfied, as well as allowing for optimization of functions like the tracking of an object within the composite field-of-view 1800.

Figure 19:
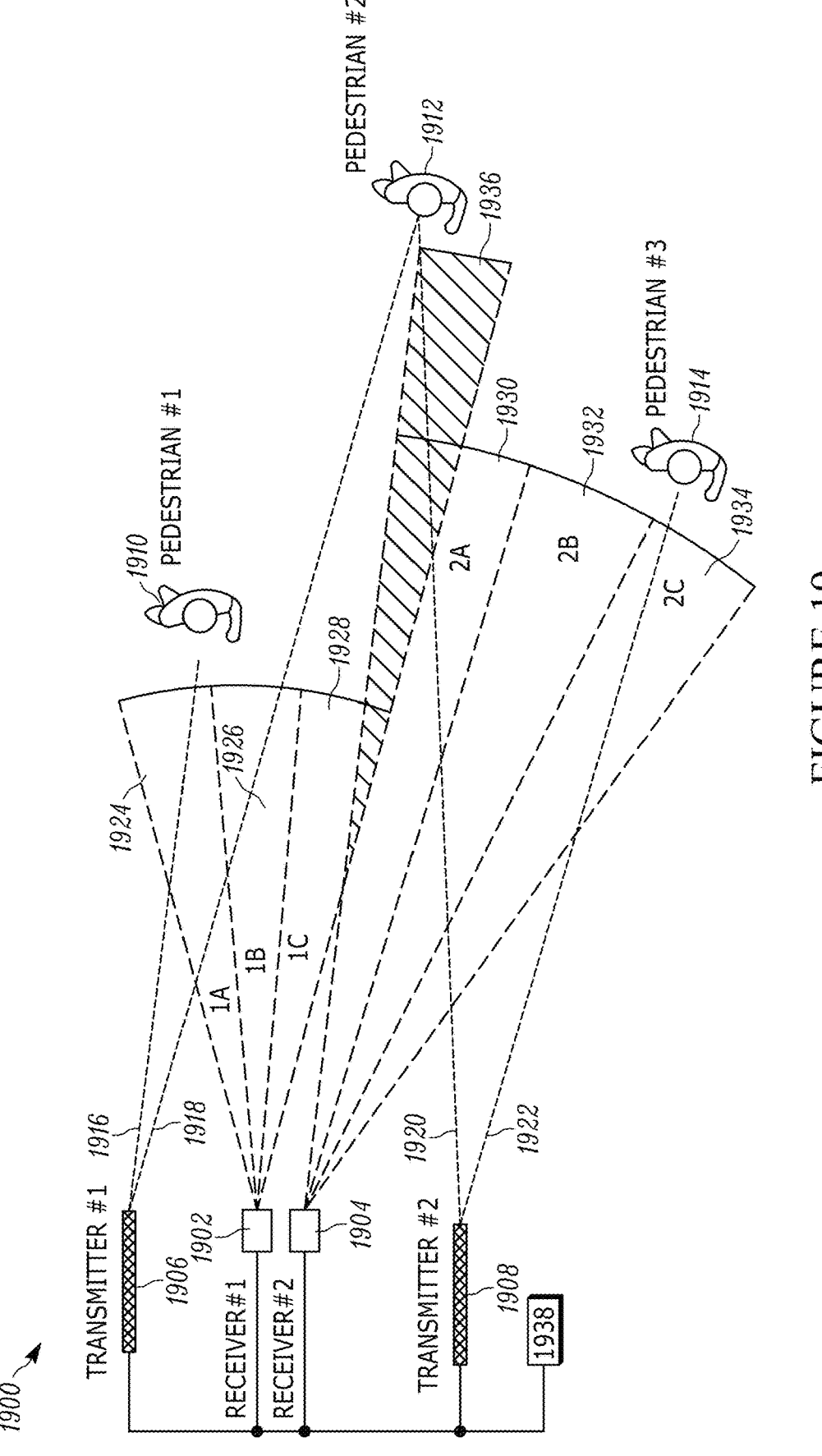
FIG. 19 illustrates an embodiment of an operating sce-nario comprising a modular LIDAR system according to the present teaching including two separate receivers and two separate transmitters.

FIG. 19 illustrates an embodiment of an operating scenario 1900 comprising a modular LIDAR system according to the present teaching with two separate receivers 1902, 1904 and two separate transmitters 1906, 1908. In this operating scenario 1900, the two receivers 1902, 1904 each have an overall field-of-view equal to 30° and are configured to have some overlap in their field-of-view in order ensure that there are no gaps in coverage. This allows continuous tracking of, for example, pedestrians 1910, 1912, 1914. The two separate transmitters 1906, 1908 each contain a plurality of lasers. The two pairs of dashed lines 1916, 1918, 1920, 1922 from each transmitter show the projection angle of two lasers within each transmitter. The two lasers are chosen to correspond to the pedestrians 1910, 1912, 1914. Pedestrian #1 1910 is only within the field-of-view of transmitter #1 1906 and the receiver #1 1902. Pedestrian #3 1914 is only within the field-of-view of transmitter #2 1908 and receiver #2 1904. Pedestrian #2 1912, however, is within the field-of-view of both transmitters 1906, 1908 and both receivers 1902, 1904.

Both receivers 1902, 1904 use an array of detectors. Each detector in the array of detectors has a field-of-view that is a subset of the overall receiver field-of-view. See, for example, FIG. 7B and the associated description. In the operating scenario 1900 shown, the field-of-view of each receiver is illustrated as split into three sections, each with a 10° field-of-view. For receiver #1 1902 these are regions 1A 1924, 1B 1926 and 1C 1928. For receiver #2 1904, these are regions 2A 1930, 2B 1932 and 2C 1934. A three-element detector array of uniform dimension in the horizontal plane would correspond to the fields-of-view 1924, 1926, 1928, 1930, 1932, 1934 for either receiver 1902, 1904. It should be understood that the operating scenario 1900 is drawn for simplicity and that the detector array size might be larger in actual practice in order to have a smaller field-of-view per individual detector. The field-of-view of each detector is labeled uniquely (1A, 1B, 1C, 2A, 2B, 2C) for reference.

A single controller 1938 can be used to control both receivers 1902, 1904 and both transmitters 1906, 1908. The operating scenario 1900 shown in FIG. 19 illustrates that pedestrian #1 is only seen by Receiver #1, but by both detectors 1A and 1B. Pedestrian #2 can be seen by both Receiver #1 and Receiver #2, as the field-of-view of detector 1C and detector 2A have substantial overlap. The overlap is indicated by the diagonally hatched region 1936. The controller 1938 has knowledge of the particular fields-of-view 1924, 1926, 1928, 1930, 1932, 1934 corresponding to each detector element for both receivers 1902, 1904 and, thus has knowledge of this region of overlap. The controller 1938 also has knowledge of the projection angles 1916, 1918, 1920, 1922 of the lasers within transmitter #1 1906 and within transmitter #2 1908 and, thus can compute which detectors at which range distance can be used to measure the reflected pulse from each laser within each transmitter 1906, 1908.

The controller 1938 sets the laser energizing pattern for lasers in the two transmitters 1906, 1908, and selects which detector or combination of detectors within all possible receivers 1902, 1904 to measure the return signal pulse. A typical criteria for selection of the optimum detector to measure each laser and range might include maximum received signal power, or highest SNR. There is a possibility of optical cross-talk resulting in a false measurement if the controller 1938 does not control the energizing pattern in the overlap region 1936 between the detectors in the two receivers 1902, 1904. For example, pedestrian #2 1912 can be measured using either transmitter 1906, 1908. If the controller 1938 energized a pulse from transmitter #1 1906 at pedestrian #2 1912, and before that pulse was measured by a receiver 1902, 1904, energized a second pulse from transmitter #2 1908, then both pulses would be observed at a single detector during a single measurement. This would result in an error in distance and/or a false object being detected. The controller 1938 controls the energizing pattern so as to maintain a strict one-to-one mapping between laser and detector during a single measurement, within the field-of-view of that chosen detector. This prevents optical cross-talk and errors in measurement within the modular LIDAR system.

FIG. 20 illustrates a block diagram 2000 of an embodiment of a controller 2002 of the present teaching. For simplicity, the controller 2002 is shown communicating with two receivers 2004, 2006 and two transmitters 2008, 2010, whereas in actual use, any number of receivers and controllers could be present. The controller 2002 has various sets of information stored and available. This information can be determined during setup/calibration and/or updated during the operation of the system. This information includes system constraints 2012. For example, system constraints can include the maximum duty cycle for a single laser, eye safety constraints on the system operation, and other types of constraints. There is also laser data 2014 that includes the projection angle and origin point of each laser with respect to the corresponding transmitter. In addition, there is detector data 2016 that includes the field-of-view of the each detector and the origin of each detector with respect to its corresponding receiver. Furthermore, the controller 2002 has system position information 2018, for example, information on the position of each transmitter and receiver module within the system, relative to some global origin and/or axes.

The controller 2002 can utilize the TOF measurement information from the receivers as additional inputs to determine the laser selection and energizing pattern algorithm/process. The TOF computation can be performed within the same physical unit as the optical receiver or can be performed elsewhere.

The controller 2002 executes an algorithm that controls the laser selection and energizing pattern. Since this is a solid-state system, many types of energizing and scanning patterns are possible within the field-of-view. In one embodiment of a method according to the present teaching, the controller 2002 executes a first step 2020 of selecting lasers to be fired for each transmitter. In a second step 2022, the controller selects corresponding detectors. In a third step 2024, the controller checks for overlap in the field-of-view of those lasers and detectors. If there is no overlap that could result in errors and/or optical cross talk, the controller proceeds to a fourth step 2026 where the lasers are energized. The corresponding return pulses are received at receiver #1 2004 and/or receiver #2 2006. If there is overlap, then the controller 2002 proceeds back to the first step 2020 and chooses a new set of lasers to energize accordingly and adjusts the energizing pattern as required to accommodate the desired overlap conditions. After return pulses are received at receiver #1 2004 and/or receiver #2 2006, a TOF analysis 2028 is performed. The results of the analysis 2028 can be used in step one 2020 to determine which energizing pattern to proceed with next.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A modular light detection and ranging (LIDAR) system comprising:

a) a first optical transmitter comprising a first and second two-dimensional array of emitters that generate a first and second array of optical beams with interleaved fields-of-view at a target range when energized;

b) a second optical transmitter comprising a first and second two-dimensional array of emitters that generate a first and second array of optical beams with interleaved fields-of-view at the target range when energized, wherein the first and second optical transmitters are positioned so at least some of the optical beams in the first and second array of optical beams generated by the first optical transmitter when energized and at least some of the optical beams in the first and second array of optical beams generated by the second optical transmitter when energized overlap at the target range;

c) an optical receiver comprising a plurality of optical detectors, a respective one of the plurality of optical detectors being positioned to detect a respective optical beam generated by at least one of the first and second optical transmitter and reflected by a target in the field-of-view at the target range; and d) a controller comprising a first and second output being connected to respective control inputs of the first and second optical transmitters, and a third output being connected to a control input of the optical receiver, the controller generating control signals at the first and second outputs that control energizing select ones of the emitters in the first and second two-dimensional array of emitters in both the first and second optical transmitters that generate the first and second array of optical beams with interleaved fields-of-view at the target range when energized and generating a control signal at the third output that activates selected ones of the plurality of optical detectors to detect optical beams reflected from an object at the target range.

2. The modular light detection and ranging system of claim 1 wherein a relative position of the first and second array of at least one of the first and second optical transmitters is selected to provide a desired angular resolution of the modular light detection and ranging system.

3. The modular light detection and ranging system of claim 1 wherein a wavelength of the first two-dimensional array of emitters is different from a wavelength of the second two-dimensional array of emitters in at least one of the first and second optical transmitters.

4. The modular light detection and ranging system of claim 1 wherein the controller controls energizing select ones of the emitters in the first and second two-dimensional arrays of emitters in both the first and second optical transmitters that generate the first and second array of optical beams with interleaved fields-of-view at the target range when energized so that only one of the first and second transmitters generate an optical beam that when reflected off the object at the target range is detected by one of the plurality of optical detector during a particular light detection and ranging measurement.

5. The modular light detection and ranging system of claim 1 wherein the controller controls energizing select ones of the emitters in the first and second two-dimensional arrays of emitters in both the first and second optical transmitters that generate the first and second array of optical beams with interleaved fields-of-view at the target range when energized so that cross talk resulting from the optical beams with fields-of-view that overlap at the target range is reduced.

6. The modular light detection and ranging system of claim 1 wherein the controller controls energizing select ones of the emitters in the first and second two-dimensional arrays of emitters in both the first and second optical transmitters that generate the first and second array of optical beams with interleaved fields-of-view at the target range when energized so that cross talk resulting from the optical beams with fields-of-view that overlap at the target range is minimized.

7. The modular light detection and ranging system of claim 1 wherein the controller controls energizing select ones of the emitters in the first and second two-dimensional arrays of emitters in both the first and second optical transmitters that generate the first and second array of optical beams with interleaved fields-of-view at the target range when energized so that an optical power in an aperture at the target range is less than a predetermined amount.

8. The modular light detection and ranging system of claim 7 wherein the predetermined amount is less than a maximum permissible exposure (MPE).

9. The modular light detection and ranging system of claim 1 further comprising:

a) a second optical receiver comprising a plurality of optical detectors, a respective one of the plurality of optical detectors being positioned to detect a respective optical beam generated by at least one of the first and second optical transmitter and reflected by the target in the field-of-view at the target range; and b) the controller further comprising a fourth output being connected to a control input of the second optical receiver, the controller generating a control signal at the fourth output that activates selected ones of the plurality of optical detectors in the second optical receiver to detect optical beams reflected from the object at the target range, wherein the controller generates control signals at the third and fourth outputs such that only selected ones of the plurality of optical detectors in either the first optical receiver or the plurality of optical detectors in the second optical receiver detect optical beams reflected from the object at the target range at one time.

10. The modular light detection and ranging system of claim 1 wherein the first and second optical transmitters are housed in a single enclosure.

11. The modular light detection and ranging system of claim 1 wherein the first and second optical transmitters are housed in physically separate enclosures.

12. The modular light detection and ranging system of claim 1 wherein the optical receiver is housed in an enclosure that is physically separate from enclosures housing the first and second optical transmitters.

13. The modular light detection and ranging system of claim 1 wherein at least one of the first and second optical transmitters and the optical receiver are housed in a same enclosure.

14. The modular light detection and ranging system of claim 1 wherein at least one of the first and second optical transmitters, the optical receiver, and the controller are housed in a same enclosure.

15. The modular light detection and ranging system of claim 1 wherein the plurality of optical detectors in the optical receiver comprises a two-dimensional array.

16. The modular light detection and ranging system of claim 1 wherein at least one of the first and second two-dimensional arrays of at least one of the first and second optical transmitters comprises a VCSEL array.

17. A method of modular light detection and ranging (LIDAR), the method comprising:

a) generating a plurality of optical beams having a field-of-view (FOV) at a target range when energized with a plurality of first emitters in a first transmitter;

b) generating a plurality of optical beams having a field-of-view at the target range when energized with a plurality of second emitters in a second transmitter;

c) positioning the first and second optical transmitters relative to each other so the fields-of-view of at least some of the optical beams generated by the first and second optical transmitter when energized overlap at the target range;

d) positioning a plurality of optical detectors so that respective ones of the plurality of optical detectors detect respective optical beams generated by at least one of the first and second optical transmitter that are reflected by a target in the field-of-view at the target range; and e) energizing select ones of the plurality of first and the plurality of second emitters that generate optical beams with fields-of-view that overlap at the target range and activating selected ones of the plurality of optical detectors to detect optical beams reflected from an object at the target range.

18. The method of modular LIDAR of claim 17 further comprising energizing select ones of the plurality of first and the plurality of second emitters that generate optical beams with the fields-of-view that overlap at the target range so that only one of the first and second transmitters generate an optical beam that when reflected off the object at the target range is detected by one of the plurality of optical detectors during a particular light detection and ranging measurement.

19. The method of modular LIDAR of claim 17 further comprising energizing select ones of the plurality of first and the plurality of second emitters that generate optical beams with fields-of-view that overlap at the target range so that cross talk resulting from the optical beams with fields-of-view that overlap at the target range is reduced.

20. The method of modular LIDAR of claim 17 further comprising energizing select ones of the plurality of first and the plurality of second emitters that generate optical beams with fields-of-view that overlap at the target range so that an optical power in a particular eye safety measurement aperture is less than a predetermined amount.

21. The method of modular LIDAR of claim 17 wherein the plurality of optical beams generated by the first emitters has a first wavelength and the plurality optical beams generated by the second emitters has a second wavelength.

22. The method of modular LIDAR of claim 17 wherein at least two of the plurality of first emitters generate optical beams at different wavelengths.

\* \* \* \* \*